United States Patent
Speier et al.

(10) Patent No.: US 10,498,689 B2
(45) Date of Patent: Dec. 3, 2019

(54) METHOD AND SYSTEM FOR CREATING AND RUNNING CONTESTS ON SOCIAL FEEDS AND OTHER COMMUNICATION PLATFORMS

(71) Applicants: Eric Paul Speier, Long Beach, CA (US); Michael R Givens, Lakewood, CA (US); Benjamin B Spees, Portland, OR (US)

(72) Inventors: Eric Paul Speier, Long Beach, CA (US); Michael R Givens, Lakewood, CA (US); Benjamin B Spees, Portland, OR (US)

( * ) Notice: Subject to any disclaimer, the term of this patent is extended or adjusted under 35 U.S.C. 154(b) by 448 days.

(21) Appl. No.: 15/215,420

(22) Filed: Jul. 20, 2016

(65) Prior Publication Data

US 2018/0021678 A1  Jan. 25, 2018

(51) Int. Cl.
| | | |
|---|---|---|
| *A63F 13/00* | (2014.01) |
| *H04L 12/58* | (2006.01) |
| *H04L 29/06* | (2006.01) |
| *G06Q 50/00* | (2012.01) |
| *H04L 12/18* | (2006.01) |
| *A63F 13/335* | (2014.01) |

(52) U.S. Cl.
CPC ............. *H04L 51/32* (2013.01); *G06Q 50/01* (2013.01); *H04L 12/1895* (2013.01); *H04L 65/1069* (2013.01); *H04L 67/42* (2013.01); *A63F 13/335* (2014.09); *A63F 2300/407* (2013.01)

(58) Field of Classification Search
None
See application file for complete search history.

(56) References Cited

U.S. PATENT DOCUMENTS

| | | | | |
|---|---|---|---|---|
| 6,659,861 | B1* | 12/2003 | Faris | A63F 13/12 463/1 |
| 6,993,572 | B2* | 1/2006 | Ross, Jr. | G06Q 30/06 709/218 |
| 7,818,399 | B1* | 10/2010 | Ross, Jr. | G06Q 30/06 709/218 |
| 8,229,819 | B2 | 7/2012 | Ransom et al. | |
| 8,234,193 | B2 | 7/2012 | Ransom et al. | |
| 2002/0042293 | A1* | 4/2002 | Ubale | A63F 13/12 463/9 |
| 2004/0043810 | A1* | 3/2004 | Perlin | G06Q 30/02 463/16 |
| 2007/0226062 | A1* | 9/2007 | Hughes | G06Q 30/02 705/14.14 |
| 2007/0243936 | A1* | 10/2007 | Binenstock | G06Q 30/02 463/42 |
| 2008/0167960 | A1* | 7/2008 | Hughes | G06Q 30/02 705/14.14 |
| 2010/0217645 | A1 | 8/2010 | Jin et al. | |

(Continued)

*Primary Examiner* — Paul A D'Agostino

(57) ABSTRACT

A method and apparatus for creating and running contests are provided. In the method and apparatus one or more groups of predetermined criteria based on one or more user posts collected by a software client are generated. The one or more groups of predetermined criteria to one or more challenges are assigned. A response to the one or more challenges is received. In response to receiving the response to the one or more challenges, the response to the one or more predetermined criteria is compared and the correctness of the received response is determined.

7 Claims, 34 Drawing Sheets

(56) References Cited

U.S. PATENT DOCUMENTS

| | | | |
|---|---|---|---|
| 2012/0058808 A1* | 3/2012 | Lockton | G07F 17/32 463/9 |
| 2012/0203842 A1* | 8/2012 | Lakhani | G06Q 10/101 709/205 |
| 2012/0313948 A1* | 12/2012 | Bergman | G06Q 10/101 345/440 |

* cited by examiner

Fig. 10

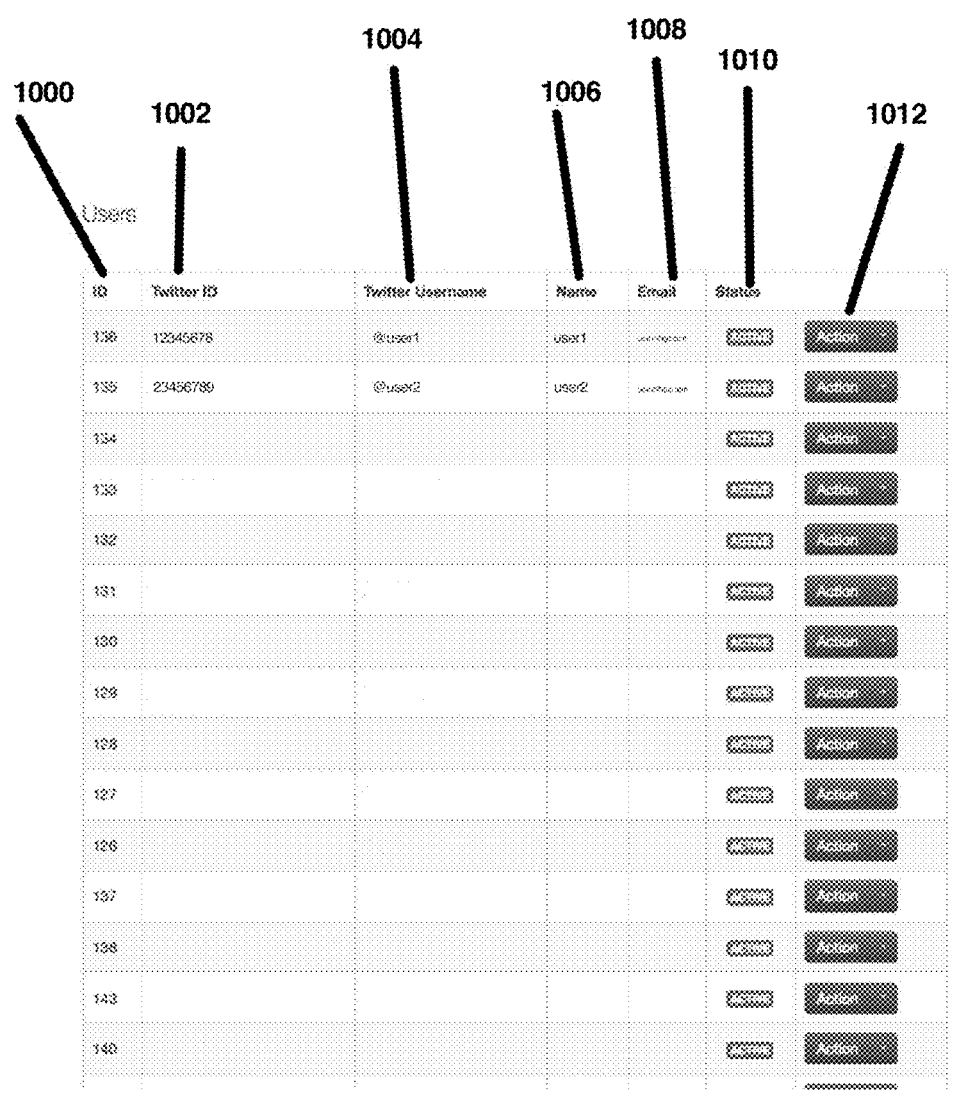

| ID | Twitter ID | Twitter Username | Name | Email | Status | |
|---|---|---|---|---|---|---|
| 136 | 12345678 | @user1 | user1 | ******* | ⬚ | ▓▓ |
| 135 | 23456789 | @user2 | user2 | ******* | ⬚ | ▓▓ |
| 134 | | | | | ⬚ | ▓▓ |
| 133 | | | | | ⬚ | ▓▓ |
| 132 | | | | | ⬚ | ▓▓ |
| 131 | | | | | ⬚ | ▓▓ |
| 130 | | | | | ⬚ | ▓▓ |
| 129 | | | | | ⬚ | ▓▓ |
| 128 | | | | | ⬚ | ▓▓ |
| 127 | | | | | ⬚ | ▓▓ |
| 126 | | | | | ⬚ | ▓▓ |
| 137 | | | | | ⬚ | ▓▓ |
| 138 | | | | | ⬚ | ▓▓ |
| 143 | | | | | ⬚ | ▓▓ |
| 140 | | | | | ⬚ | ▓▓ |

1000 — Users
1002 — Twitter ID
1004 — Twitter Username
1006 — Name
1008 — Email
1010 — Status
1012

1800
1802 walkerstalkerdemo

User2 @user2
Woot! Woot! #walkerstalkerdemo

User1 @user1
I just won the On Da Cover medal in the Walker Stalker Demo #walkerstalkerdemo User1 @user1
Glenn #walkerstalkerdemo Moderator @moderator
Name the character in this cover. Include Fig. 21
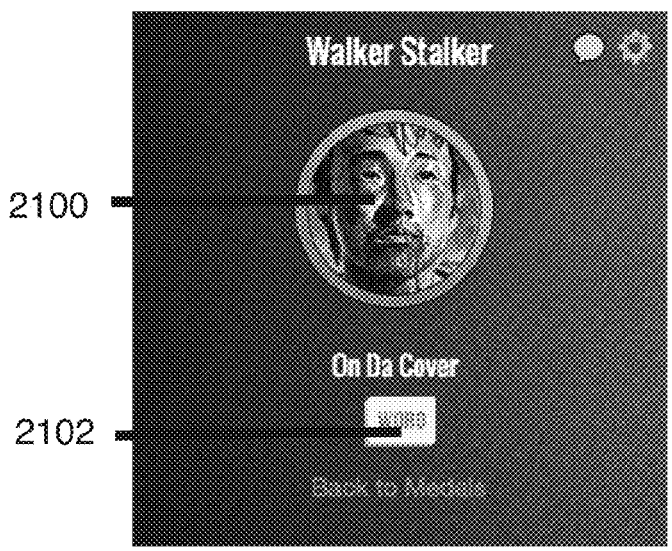
2100
2102
walkerstalkerdemo
User2 @user2
Woot! Woot! #walkerstalkerdemo
User1 @user1
I just won the On Da Cover medal in the Walker Stalker Demo #walkerstalkerdemo
User1 @user1
Glenn #walkerstalkerdemo
Moderator @moderator
Name the character in this cover. Include

2400 walkerstalkerdemo

2402

User3 @user3
I just won the On Da Cover medal in the Walker Stalker Demo #walkerstalkerdemo User3 @user3
Glenn #walkerstalkerdemo User2 @user2
Woot! Woot! #walkerstalkerdemo User1 @user1
I just won the On Da Cover medal in the Walker Stalker

METHOD AND SYSTEM FOR CREATING AND RUNNING CONTESTS ON SOCIAL FEEDS AND OTHER COMMUNICATION PLATFORMS

CROSS-REFERENCE TO RELATED APPLICATION

This application claims the benefit under 35 U.S.C. § 119(e) of Provisional Patent Application No. 62/196,176, filed Jul. 23, 2015, the entire disclosure of which is hereby incorporated by reference.

FIELD OF THE INVENTION

This invention relates to a contest/prizing system that utilizes administrative software on an application server to create and track a series of challenges. Client software on a number of computerized hardware platforms allow users to join contests, track contests and acts as a conduit between the application server and one or more communication platforms like social media feeds. In turn, moderator/user conversations that consist of any number of actions allowed by the communication platform(s) are scanned, logged, and compared to the predetermined criteria for the challenges, and the result of that comparison is sent to the client software, often in the form of a reward with real or perceived value.

BACKGROUND

Social networking sites and other electronic communication platforms are a way for users to connect and communicate with many people around the world using any number of actions. Text entry, using audio/visual materials, using emotes, sharing, liking, reposting, linking, messaging, geotagging, filtering. The list is varied and long. Creating a way for organizations to seed, scan, and log conversations around topics they want to speak about to their followers can create directed and important conversations to the organization and its followers. These conversations can be gamefied by creating contests that are looking for certain specific communication platform actions to be entered by their follower's responses to the conversation. The result of those specific completed actions during the conversations triggers rewards. This not only triggers more engagement in conversations, it triggers competition, and also entices the follower's followers to engage. Commonly this is the mechanisms of virality of online content.

SUMMARY

The invention is a system and method for creating and running contests using communication platforms as the medium for action.

On an application server, a set of one or more predetermined criteria are created in groups and assigned to one or more challenges. One or more challenges make up a contest and contests are assigned to one or more communication platforms.

These contests are competitions or other promotions created for organizations to generate more awareness around their brand, increase social engagement around their organization, and to bring in new users to follow the organization on social media as well as promoting existing and new users to utilize the goods and services of the organization.

Contests and the ensuing conversations on one or more communication platforms over the client software provides a way for interaction with the organization in a way that rewards specific actions around those interactions to be instantly rewarded with items of real or perceived value.

Using the actions of the various communication platforms to increase awareness of the contest, the organization, its history, current events, goods and services, and other information are included in the predetermined criteria for each challenge and contest.

This promotes both a short term engagement using skill based competition between the plurality of users as well as other competitive and non-competitive actions, and a long term engagement using multiple challenges and contests over a definable length of time.

In one or more embodiments the predetermined criteria and challenges are created before the contest starts. In alternate embodiments Predetermined criteria and challenges can be created during the contest and be based on existing conversations or posts on communication feeds, such as current events, breaking news, conversations on communication platforms, posts on communication platforms. In alternate embodiments predetermined criteria and challenges can be created both before and after the contest starts.

In one or more embodiments predetermined criteria can be one or more actions that are based on the actions of the chosen communication platform(s). For example, words, phrases, or sentences, hashtags or other filters, geotagging, audio and video content, reposting, liking, and sharing. These are examples, but predetermined criteria are not limited to the examples. Any action that a communication platform supports can be turned into predetermined criteria.

In example embodiments, predetermined criteria takes the form of a series of grouped actions. Within and between the groups are the operators 'and' & 'or'. For example (a|b|c) &(d|e|f). where the letters are actions |='or' and &='and'

A number of software client embodiments that provides a system and method to connect various communication platforms with an application server that tracks moderated post and user response conversations.

Tracks and displays the results of those conversations.

Allows for direct and indirect communication from the organization and its moderators Displays graphical representations of various contest elements from, registration into, viewing moderated posts from, sending responses to, and tracking of the contest from the chosen communication platform(s) and the application server.

In one or more embodiments, the software client can be a mobile app, tablet app, computer app, web app, SmartTV app, video game console app, VR console app, digital watch app. In alternate examples the client software can be installed or built into a $3^{rd}$ party app or web page. These are examples. The client software can reside on hardware platforms that connect to any internet or intranet, have an accessible SDK for developing the software for that platform, and be able to connect to a communication platform.

Example embodiments of communication platforms for the contest could include but are not limited to social media feeds such as Twitter, Facebook, Instagram, Snapchat, streaming and live streaming sites like Youtube, Vimeo and Twitch, private and semi private feeds like proprietary feeds, internal company feeds, forums, and bulletin boards. These are example only. Communication platforms can be any electronic feeds that allow for outside systems to access the actions available on that feed. Responses to moderated posts are conducted on one or more of these communication platforms.

Moderated posts for a contest are conducted through one or more communication/media platforms. In one or more embodiments, moderation can take place on the communication platform(s) for which the contest is set up. In alternate embodiments moderation can take place on any number of other communication platforms like, broadcast TV, movies, cable TV, televised sports events, sports events, closed circuit TV, movie theater screen, TV commercial, internet commercials, Jumbotron, newspaper, live webcast, news broadcast, video streaming site, or magazine. The communication platforms for moderation are not limited to the preceding list and can consist of any form of media or communication. In alternate embodiments, moderated posts can take place on multiple communication platforms over the course of a predetermined criteria, challenge, or contest.

Moderators, for example, can be live person(s), celebrities, influencers, chatbots, brand feeds, or brand representatives. In alternate embodiments moderators can be a visual or audio communication or hint.

Moderated posts can request a specific action(s), the opening and/or continuation of a conversation, a current event report of comment, a direct question, asks for a prediction, has user pick a team and post to that team's hashtag (filter) to make it trend more than other teams, leads users to another communication platform for another moderated post(s), gives hints. These are examples and communications can take other forms.

The action of moderated posts and user responses are known as conversations. Conversations organically lead users to responses that match predetermined criteria.

There is a great amount of variation to the types of challenges, their supporting predetermined criteria, and the ensuing conversations around them make up. Example embodiments could be trivia, prediction, physical or virtual treasure hunts, commentary on current events, fact checking games, predictive games, emoji puzzles, hidden objects, picture recognition, information research, 20 questions, identify a moderator, complete a specific action, riddles, pictures, video, sound of specific subject matter, selfies, posting a specific audio or visual file, send requested information, sending information to followers of a user's feed, reposting a moderated post, or reposting a specific post. This list is just are just examples and types of challenges are not limited to the list.

A system and method for an application server to scan user responses from the communication platform and/or software client, log those responses, and attempt to match to the predetermined criteria and send the results of that match to the software client.

The application server may directly scan the user responses from the communication platform or the software client may scan the communication platform and send the responses to the application server.

The result of a match that completes the predetermined criteria for a single challenge or for all of the challenges could be an instant prize, a consolation prize, a grand prize, an entry into a sweepstakes, points, a leaderboard assignment, congratulations, or anything else with any perceived value The results of a match of predetermined criteria to a user response can be delivered on the communication platform(s), other communication platforms, via a direct message, by push notification or text message, email, telephone, mail. These are examples and can be any form of communication that the user can receive.

In one or more embodiments, there are many mechanisms in which rewards are awarded for user response that match the predetermined criteria. For example, the $1^{st}$ user to match their user responses to one or all of the predetermined criteria for a single challenge or all challenges of a contest are rewarded. The $1^{st}$ x number of users, random users up to x number of users, specific submission order of matches, $1^{st}$ user for each of a number of specific predetermined criteria that can only be filled once. These are examples and other variations can be extrapolated.

BRIEF DESCRIPTION OF THE DRAWINGS

FIG. 10 shows an example embodiment of a list of contest entrants (users).

FIG. 21 shows an example embodiment of medal close-up views.

DETAILED DESCRIPTION

Figure 1:
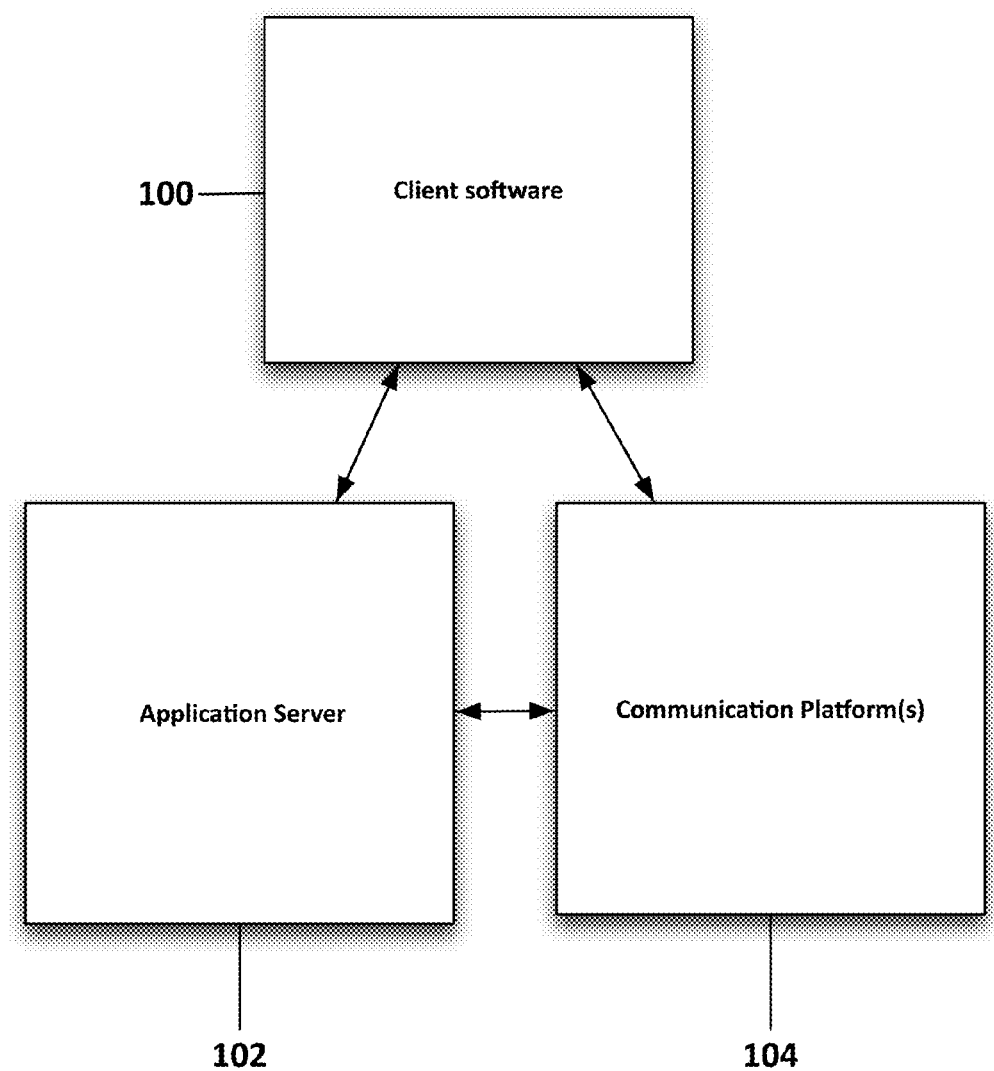
FIG. 1 shows basic interactions between hardware systems used in the contests.

FIG. 1 shows basic interactions between systems used in the contests. In one or more embodiments users interact with step 100, client software. In one or more embodiments the software is downloaded from various common software markets, although in alternate embodiments that software may reside on the internet or an intranet and be accessible through entering a URL or other such designator addresses. In other embodiments the software may be sent or installed directly into a device that accepts and can utilize said software or installed prior to hardware being acquired. Alternate embodiments would include as an example, any device, whether invented or not at the time of this filing, that can accept and utilize the software and communicate with the required hardware and software needed to run a contest. Step 102 shows an application server that is used in one or more embodiments, to create contests, challenges, predetermine contest criteria, designate various contest and marketing assets, track contests, accept user registrations and logins, collect user information, track, store, and log user's contest and other social media postings, compare user responses to predetermined contest criteria, collect information about user behavior and personal or anonymous information commonly called analytics or metrics, and communicate with the user about the state of the contest. Step 104 refers to the 2-way communication of various social media feeds. Where in one or more embodiments social media feed refers to various public or semi-public communication platforms, alternate embodiments may include but are not limited to private communication platforms, proprietary communication platforms, or communication platforms created specifically for the contest. For example one embodiment may use, YouTube, a typically public communication platform, another embodiment may use Facebook, a typically semi public communication platform, another embodiment may use a completely private communication platform such as a company that has created or utilizes an internal communication platform for its employees, another embodiment may utilize a communication platform that is created or utilized specifically for running contests. The previous examples are just singular examples of each type of communication platform and in no way reflect a comprehensive list of such communication platforms. In any embodiment, the contests may use singular or multiple simultaneous communication platforms. This system can utilize any existing or future communication platform that allows for user input and access to that input. In one or more embodiments, access to the input is realized through a public api. In alternate embodiments, the input can be realized through private api, direct access to the communication platform's code base, special arrangement with the communication platform's owners or representatives, or any other way in which access to the input can be obtained. As an example of typical use, in one or more embodiments, Step 102, application server communicates with step 100, client software to deliver information about contests. Users access the contest details via step 102, client software. If they wish to participate, the user 'signs in' to one of the available communication platforms, for example, Twitter. For example, in one or more embodiments, this sign in is accomplished through a public api where Step 104 communicates with step 100 to validate the sign in information. In one or more embodiments Step 100 collects and displays the user's feed or for example, in other embodiments may filter that feed to show specific postings or groups of postings from that communication platform. In the preferred embodiment, the user inputs desired information that they believe will fulfill one or more of the contest criteria into step 100 which in turn communicates and posts that information to step 104, in alternate embodiments the user responds directly into the communication platform, step 104. In one or more embodiments, step 100 queries step 104 to see what inputs have been made since the previous query and adds any inputs to the user feed or filtered information as described above. Query intervals are definable intervals of time. Step 100 sends those inputs to step 102 for logging and comparison to the predetermined contest criteria, and step 102 sends the results of that comparison back to step 100, which in turn displays that result to the user. In alternate embodiments, step 100 queries step 104 to see what inputs have been made since the previous query and adds any new inputs to the user feed or filtered information as described above. Step 102 also queries step 104 to see what inputs have been made since the previous query, logs new user responses, compares those user responses to the predetermined contest criteria, and sends the results of that comparison back to step 100, which in turn displays that result to the user.

Figure 2:
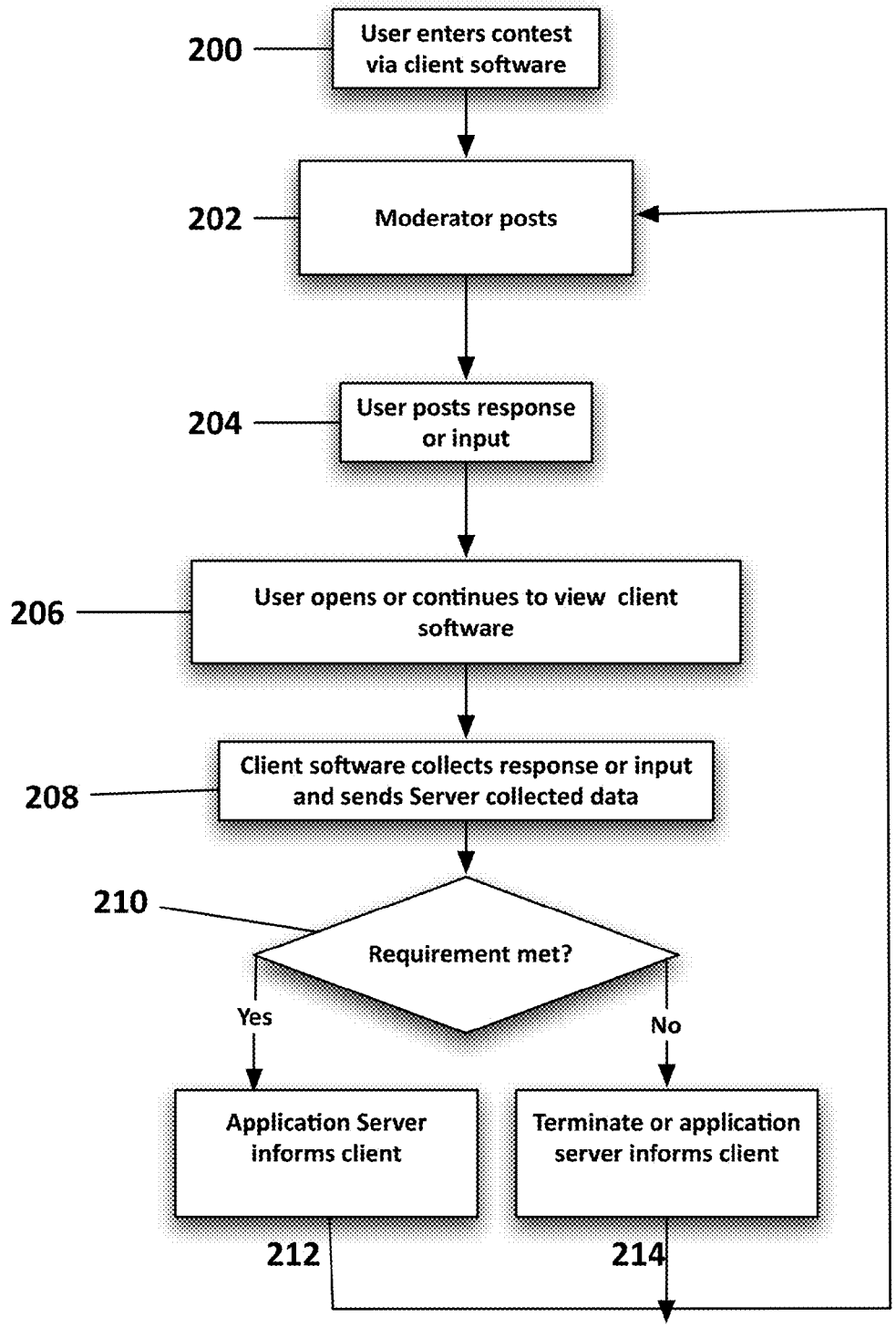
FIG. 2 shows a sample embodiment of the flow of a typical moderated post, user response, a comparison of the user response to the predetermined criteria to determine if there is a match, and the handling of the result of that comparison.

FIG. 2 shows a sample embodiment of the flow of a typical moderated post, user response, a comparison of the user response to the predetermined criteria to determine if there is a match, and the handling of the result of that comparison. In one or more embodiments, challenges are a nomenclature used to describe a singular or series of actions and reactions. In alternate embodiments challenges may be called puzzles, riddles, or any other term designated by the administrator. These designations are for example only and we will use challenge as a standard for this document with the understanding that the designation has no unique quality for its use. In step 200, users enter the contest via the client software. In one or more embodiments, client software is accessed on a web page through a computer or mobile device. In alternate embodiments the client software can be accessed as a standalone mobile app, embedded in a 3$^{rd}$ party mobile app or web page, or in a smartTV. The preceding list is just an example of the delivery method for the client software. The client software can be delivered through any conduit that allows for accessing the individual parts of the system including any communication platform used in a various embodiments. In one or more embodiments, entry into the contest, a contest being a representation of a series of bundled challenges, is engaged through a user's election to enter that contest. In one or more embodiments, that entry will be accomplished through a software button that affirms entry and presents the user with a set of rules and/or terms and conditions, which must be accepted to complete. In alternate embodiments completion of the entry can be completed through a web link, or response to form in the client software. Alternate embodiments may allow for entry in any number of typical ways for the various platforms in which the client software resides. Step 202 shows a moderator posting questions or hints. For simplicity we will call them 'moderated posts', but their form and function can vary as described in this document. In one or more embodiments, a moderator is a person who has foreknowledge of the challenges who posts messages on any number of desired communication platforms. These messages can be instructive of a desired response that matches the predetermined contest criteria, evocative of a desired response that matches the predetermined contest criteria, or through typical display on a particular communication platform, guides players to a desired response desired response that matches the predetermined criteria through association or conversation. The moderated posts can also take the form of hints that further guide a user to the desired response that matches the predetermined contest criteria. In alternate embodiments a moderator can be multiple people engaged in the above communications, as well as automated communication methods, for example, a chat-bot or an auto-post. In alternate embodiments, it can be any form of automated communication method. In one or more embodiments, the moderated posts are displayed on the specific communication platform(s) for which a particular contest is set up to use. In alternate embodiments the moderated posts are displayed on communication platforms other than the communication platform(s) for which a particular contest is set up to use, such as broadcast television or website. In alternate embodiments, the moderated posts can be displayed on both the same and different communication platforms for which a particular contest is set up to use. Step 204 shows a user posting a response (also shortened to user response or user responds) or input to the communication platform(s) for which a particular contest is set up to use. In one or more embodiments the user posts a response or input using the client software to the communication platform(s) for which a particular contest is set up to use. In alternate embodiments the user posts a response using any other available method of posting to the communication platform(s) for which a particular contest is set up to use. For example, if the contest uses Twitter, the user could post the response or input to Twitter using the client software or alternatively use Twitter's software client to post to Twitter. Step 206 shows a particular embodiment where the user then returns to the client software if they have used any other method for responding on the communication platform(s) for which a particular contest is set up to use or continues to view the client software if they used the client software to respond on the communication platform(s) for which a particular contest is set up to use. In a particular embodiment step 208 shows the client software collecting that response or input from the communication platform(s) for which a particular contest is set up to use and sending that response or input data to the application server. Step 210 shows the application server comparing the user response to the predetermined contest criteria. If the criteria and responses match, step 212 shows that the application server informs the client software that the criteria has been met. In one or more embodiments, if the criteria are not met step 214 shows that the application server terminates the action. In alternate embodiments if the criteria are not met step 214 shows that the application server informs the client software that the criteria has not been met. Steps 202 through 214 are repeated until all contest criteria are met for every challenge.

Figure 3:
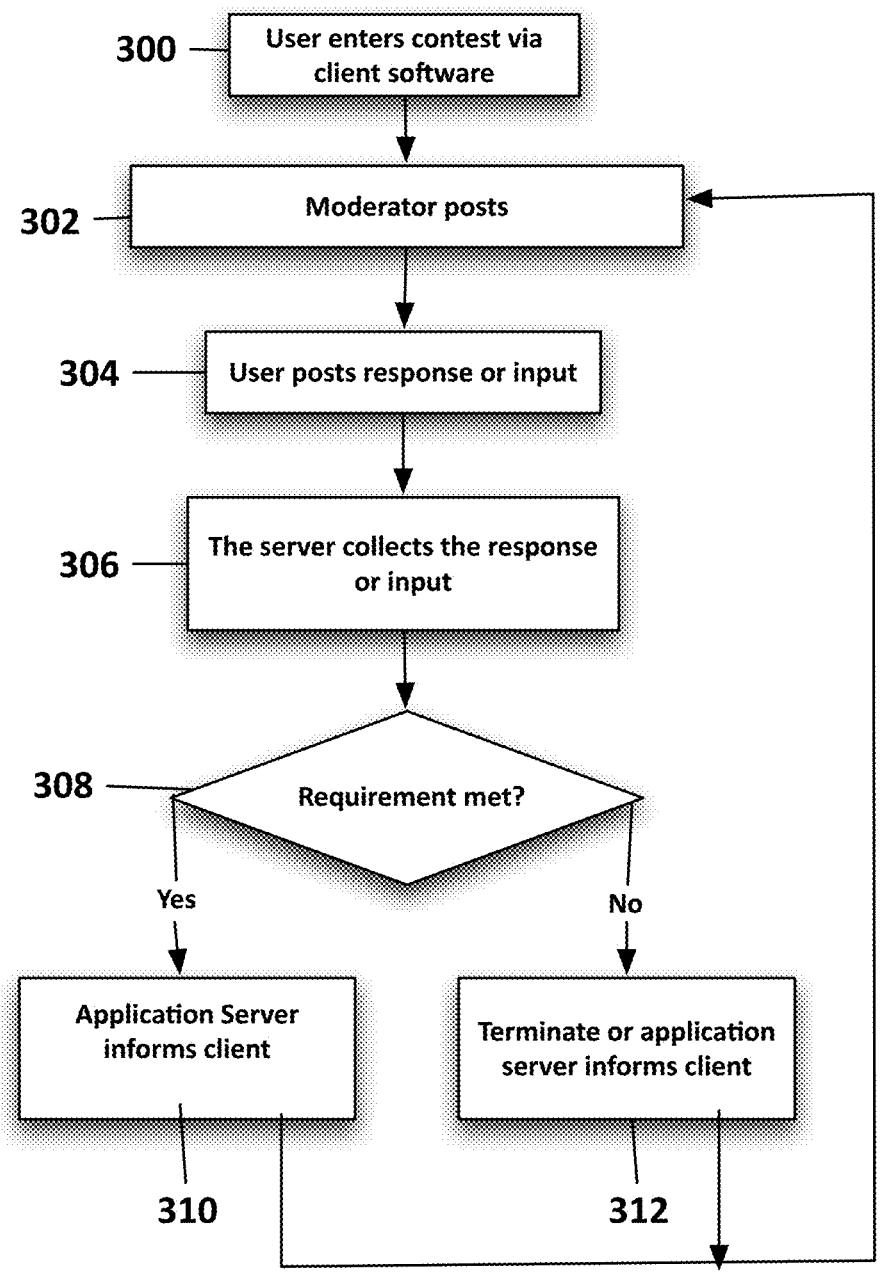
FIG. 3 shows a sample embodiment of the flow of a typical moderated post, user response, a comparison of the user response to the predetermined criteria to determine if there is a match, and the handling of the result of that comparison.

FIG. 3 shows a sample embodiment of the flow of a typical moderated post, user response, a comparison of the user response to the predetermined criteria to determine if there is a match, and the handling of the result of that comparison. In step 300 the user enters the contest, step 302 the moderator posts a moderated post. Step 304 shows the user responding. In one or more embodiments, step 306 shows the application server collecting that response or input from the communication platform(s) for which a particular contest is set up. Step 308 shows the application server comparing the user response to the predetermined contest criteria. Step 310 shows that the application server informs the client software that the predetermined criteria matched the user response and the result of that match. In one or more embodiments, if the predetermined criteria does not match the user response step 312 shows that the application server terminates the action. In alternate embodiments if the predetermined criteria do not match the user responses, step 312 shows that the application server informs the client software that the criteria has not been met. Steps 302 through 312 are repeated until all contest criteria are met for every challenge.

Figure 4:
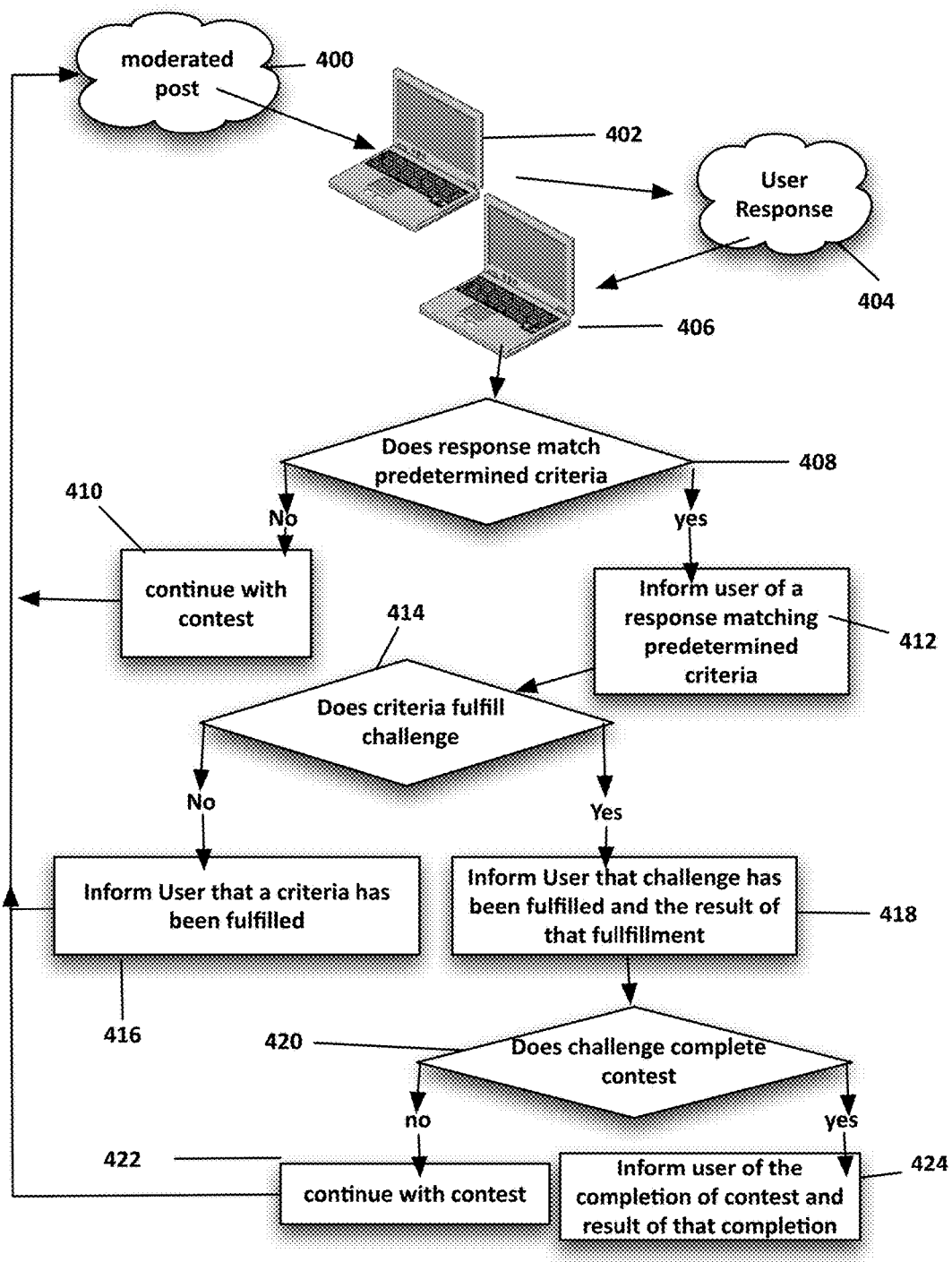
FIG. 4 shows the relationship of the moderated posts and the user responses and the comparisons of user responses to predetermined criteria and challenges throughout a contest.

FIG. 4 shows the relationship of the moderated posts and the user responses and the comparisons of user responses to predetermined criteria and challenges throughout a contest. In one or more embodiments, In step 400, the moderator enters their moderated post to the to the specific communication platform(s) for which a particular contest is set up to use, which is displayed on any number of devices (step 402) that can connect to the to the specific communication platform(s) for which a particular contest is set up to use. In alternate embodiments the moderated post can be displayed on other communication platforms that the user is directed to via the specific communication platform(s) for which a particular contest is set up to use. In one or more embodiments, the user (step 404) enters their user response to the to the specific communication platform(s) for which a particular contest is set up to use, which is displayed on any number of devices (step 406) that can connect to the to the specific communication platform(s) for which a particular contest is set up to use. In alternate embodiments the user (step 404) enters multiple user responses to the to the specific communication platform(s) for which a particular contest is set up to use, which is displayed on any number of devices (step 406) that can connect to the to the specific communication platform(s) for which a particular contest is set up to use. In step 408, the application server compares the response to the predetermined criteria for the challenge to determine if they match. In Step 410 where the user response does not match the predetermined criteria, the preferred embodiment returns to step 400 and continues in a loop through step 410. In alternate embodiments the process returns to step 404 through step 410. In alternate embodiments the process returns to either step 400 through step 406 or step 404 through step 406 as needed to maintain engagement in the challenge as determined by the moderator and/or the administrator. Where the user response does match the predetermined criteria Step 412 shows the user being informed that the user response matches the predetermined criteria. Step 414 shows the application server checking if the fulfilled criteria also fulfilled a challenge. If no, step 416 shows the process returning to step 400 and continues as described above. If yes, in step 418 the user is informed that the challenge has been fulfilled and communicates the result of that fulfillment to the client software. In one or more embodiments, the result of the fulfillment might be an instant reward. That reward might be a virtual reward, usually but not always an intellectual property like a picture file, music file, or coupon. That reward might be a real reward, where real means the reward has a physical manifestation. For example, a car, a baseball glove, or a food item might be set to the user. The types of rewards are just for example, but could be anything that might have a perceived or real value to one or more users. In alternate embodiments, the result of the fulfillment may be the receiving of points, a score, or a place on a leaderboard. In alternate embodiments, the result of the fulfillment might be entry into a sweepstakes, with a chance to win a real or virtual reward as described above. In alternate embodiments, the result of the fulfillment might just be a message of fulfillment that could be neutral, congratulatory, or humorous in nature. In alternate embodiments, the result of the fulfillment might be a communication to entice further involvement in the contest. The types of results for challenge completion may vary from challenge to challenge with results not outlined in the above examples. Step 420 shows the application server checking if the fulfilled challenge also completes the contest. If no, as shown in step 422, then the process returns to step 400 and continues as described above. If the challenge does complete the contest, the user is informed that the contest has been completed and the result of the contest completion. In one or more embodiments the result of the contest completion may be the awarding of a grand prize or a consolation prizes. In alternate embodiments, the result of the fulfillment might be entry into a sweepstakes, with a chance to win a real or virtual reward as described above. In alternate embodiments, the result of the fulfillment might just be a message of fulfillment that could be neutral, congratulatory, or humorous in nature. In alternate embodiments, the result of the fulfillment might be a communication to entice involvement in other contests. The types of results for contest completion may vary from contest to contest with results not outlined in the above examples. FIG. 4 describes an embodiment where there are organized levels for ease of use: criteria, challenges, and contests. In alternate embodiments more or fewer organized levels are possible without affecting the overall process outlined in this document.

Figure 5:
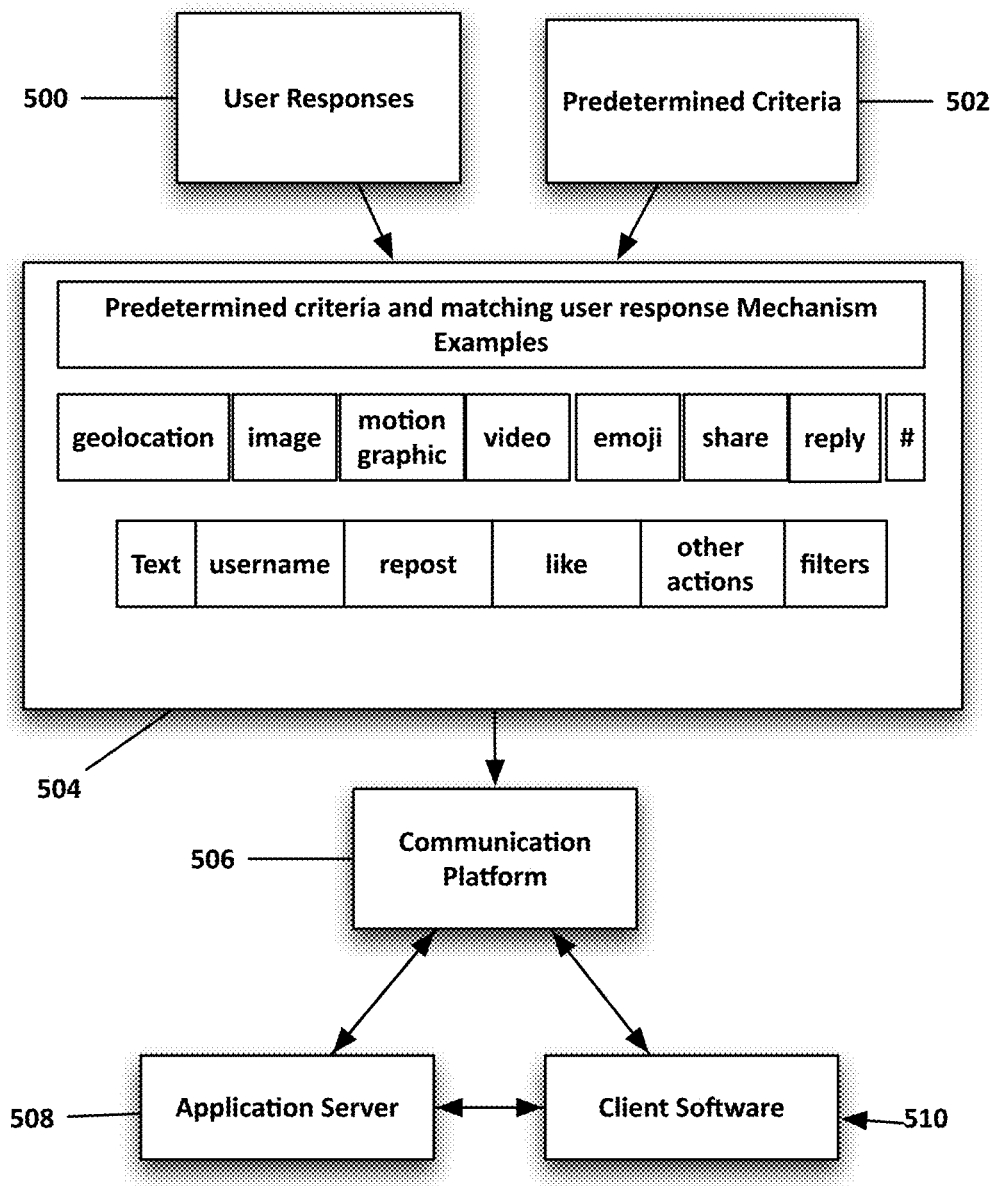
FIG. 5 shows various examples of various actions used in predetermined criteria and matching responses.

FIG. 5 shows various examples of various actions used in predetermined criteria and matching responses. Step 500 shows that a user can use various mechanisms in their user responses to try to match to the same predetermined criteria for a challenge (step 502). Step 504 shows examples of various mechanisms used in predetermined criteria and matching responses. For this figure, the shortened term 'mechanism(s)' will be used in place of 'various mechanism(s) used in predetermined criteria and matching response(s)'. In one or more embodiments a mechanism could be a word, a series of words, a phrase, and/or a series of phrases. In alternate embodiments a mechanism can be an image, such as a JPG or PNG, a motion graphic such as a GIF, a video such as an MP4, or an audio file like an mp3, aif, or way. In alternate embodiments a mechanism can be an emoji or a series of emojis. In alternate embodiments a mechanism can be a communication platform's 'post' shared or reposted, such as retweeting, or sharing. In alternate embodiments a mechanism can be a reply to a communication platform's 'post'. In alternate embodiments a mechanism can be a usage of a filter on the communication platform such as a hashtag. In alternate embodiments a mechanism can be geolocation to a particular place on the earth within a definable tolerance, for example geolocation to a point or any point 30 meters diameter around that point. In alternate embodiments a mechanism can be using a particular 'username' used by a communication platform, such as a Twitter handle, or Facebook name. In alternate embodiments a mechanism can be an affirmation as available on various communication platforms such as liking, emoting, or favoriting. In alternate embodiments a mechanism can be other actions available now or in the future that a communication platform can perform and have tracked. In alternate embodiments a predetermined criteria and matching user response can be a combination of 2 or more of any viable mechanisms. The above are examples of mechanisms, but a predetermined criteria and matching user response can be any mechanism that a communication platform makes available to its users. Step 506 shows the communication platform(s) receiving an input of the mechanism and its connection to the application server and the client software. Step 508 shows the application server and its connection to the client software and the communication platform. Step 510 shows the client software an its connection to the communication platform and the application server. The connections between steps 506, 508 and 510 are outlined in detail in FIG. 1.

Figure 6:
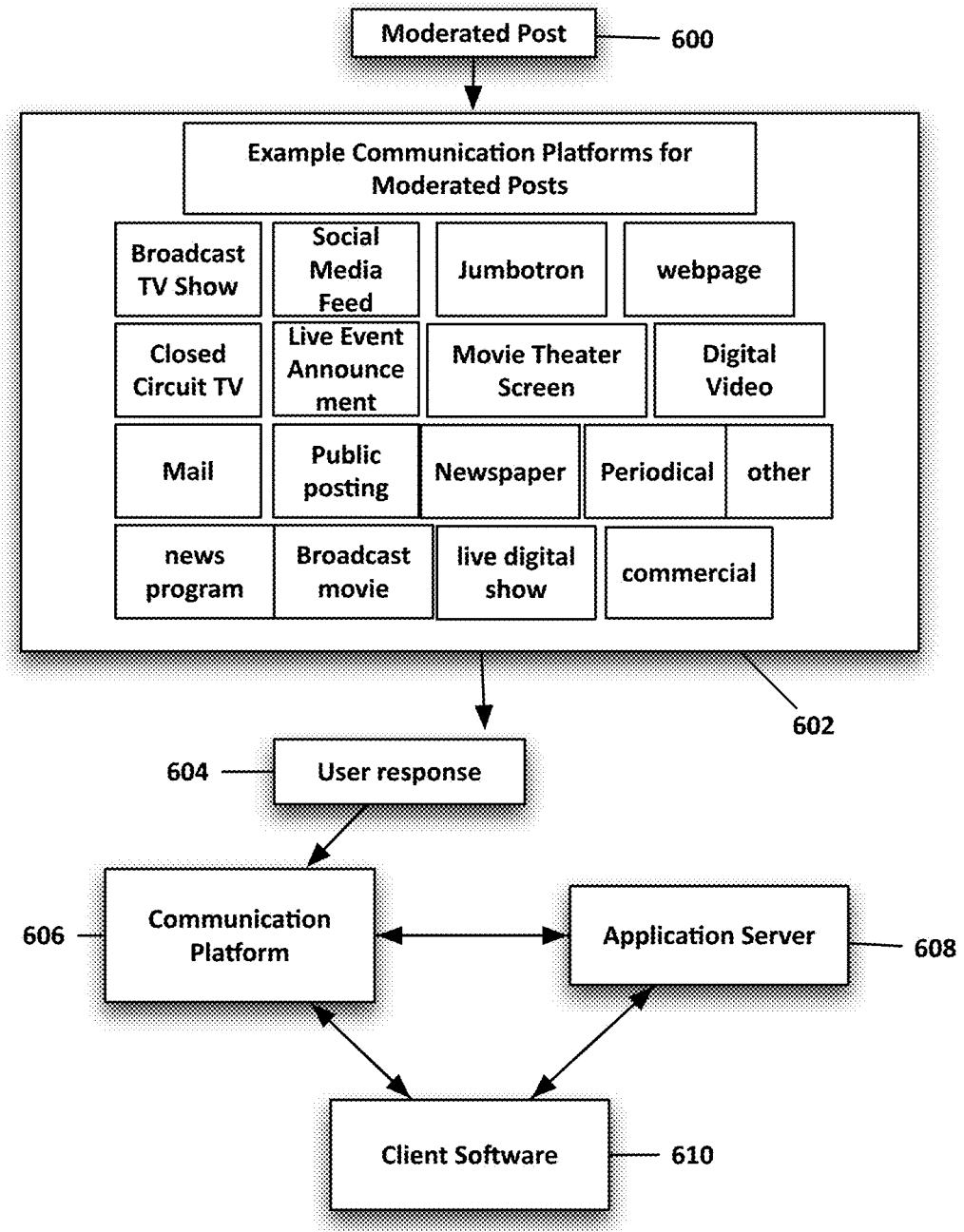
FIG. 6 shows various example platforms for moderated posts.

FIG. 6 shows various example platforms for moderated posts. Step 600 shows a moderated post being made. Step 602 shows various example communication platforms for moderated posts. In one or more embodiments the moderated post is made on the communication platform(s) for which the user is connected for the contest. For example a social media platform like Twitter or Instagram. In alternate embodiments the moderator can post on communication platform(s) other than which the user is connected for the contest. Example of alternate embodiments are, broadcast TV, where a moderated post can be embedded into the content of a broadcast TV show, live broadcast event, news show, TV commercial, or broadcast (made-for-TV) movie. Alternative embodiments moderated posts may also distributed on social media feeds such as Facebook, webpage, and digital video stream of download such as a Youtube video or live event stream. In other embodiments moderated posts may be distributed through print outlets like public posting, newspaper, periodicals, live announcement. In other embodiments moderated posts can be distributed over closed circuit TV or 'Jumbotron' or its equivalent that are popular in stadiums. In other embodiments moderated posts can be distributed on movie theater screens, home streaming video like Netflix, and on video storage media like DVD, sound streams and files like mp3. The above are for example only. Any communication platform, whether public or private, can serve as a platform for moderated posts. Step 604 shows the user response to the moderated post, which is displayed on step 606, the communication platform(s) for which the user is connected for the contest. Step 606 shows its connection to the application server and the client software. Step 608 shows the application server and its connection to the client software and the communication platform. Step 610 shows the client software an its connection to the communication platform and the application server. The connections between steps 606, 608 and 610 are outlined in detail in FIG. 1.

Figure 7:
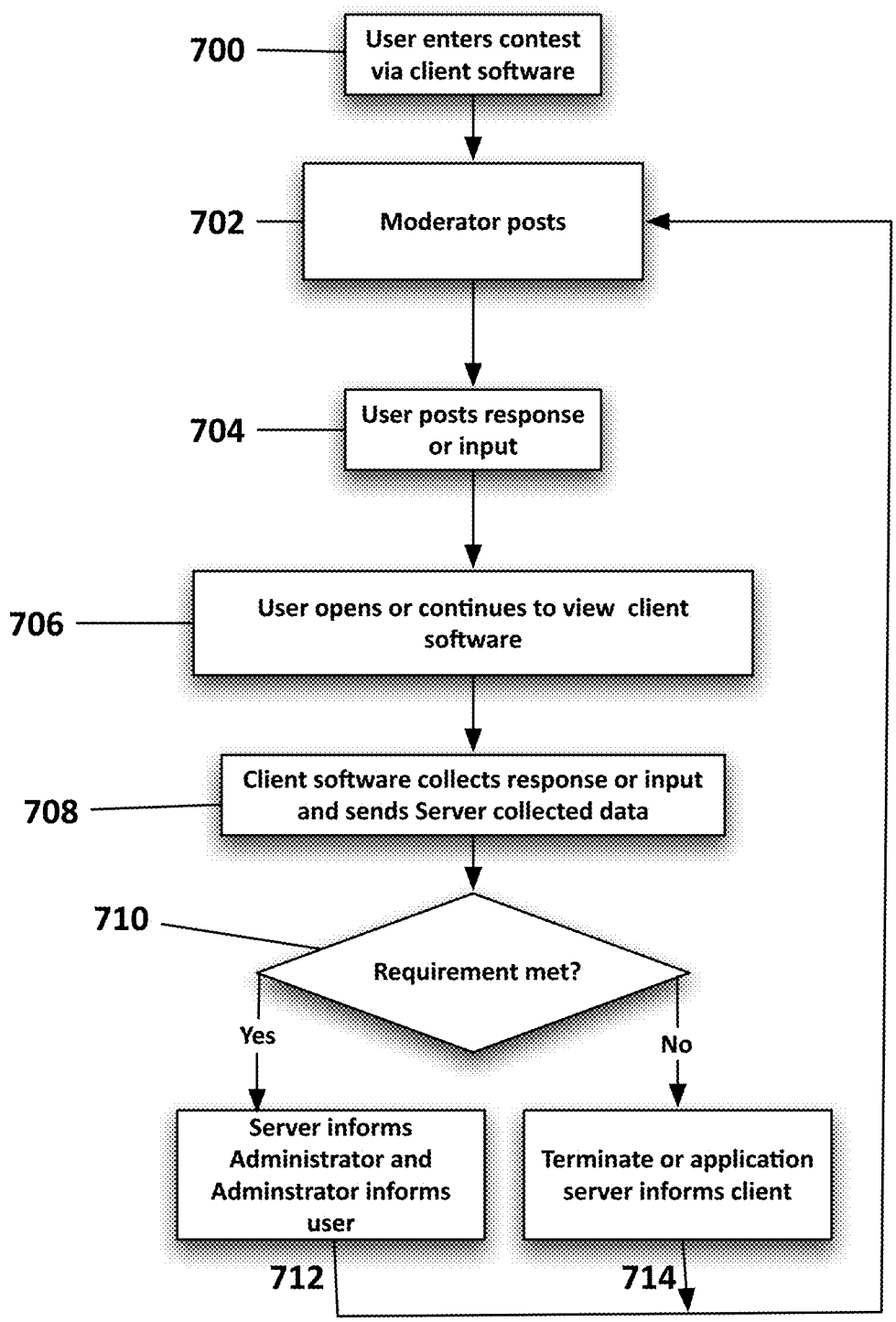
FIG. 7 shows a sample embodiment of the flow of a typical moderated post, user response, a comparison of the user response to the predetermined criteria to determine if there is a match, and the handling of the result of that comparison.

FIG. 7 shows a sample embodiment of the flow of a typical moderated post, user response, a comparison of the user response to the predetermined criteria to determine if there is a match, and the handling of the result of that comparison. In step 700 the user enters the contest, step 702 the moderator posts a moderated post. Step 704 shows the user posting a user response. Step 706 shows the user returning to or continuing to interact with the client software. Step 708 shows the client software collecting the user response or input and sending that response data to the application server. Step 710 shows the application server comparing the user response to the predetermined criteria. If the predetermined criteria matches the user response, step 712 shows that the application server informs the administrator that the criteria has been met. In one or more embodiments, the administrator is informed of the match by the application server via email. In alternate embodiments the administrator is informed in any other number of typical means of communication including but not limited to, SMS messaging, push notification, or computer popup. Further in step 712 the Administrator informs the user. In one or more embodiments the administrator manually triggers the application server to inform the client software that the criteria has been met. In alternate embodiments, the administrator, through the application server contacts the user through other communication platforms and methods. This is done, for example, through direct message, email, phone, sms message, push notification, or any other method of direct communication. In alternate embodiments the administrator manually through other communication platforms as outlined via example above. Step 714 shows that the application server terminates the action or informs the client software that the criteria and response do not match. Steps 702 through 714 are repeated until all predetermined criteria are met for every challenge of a contest.

Figure 8:
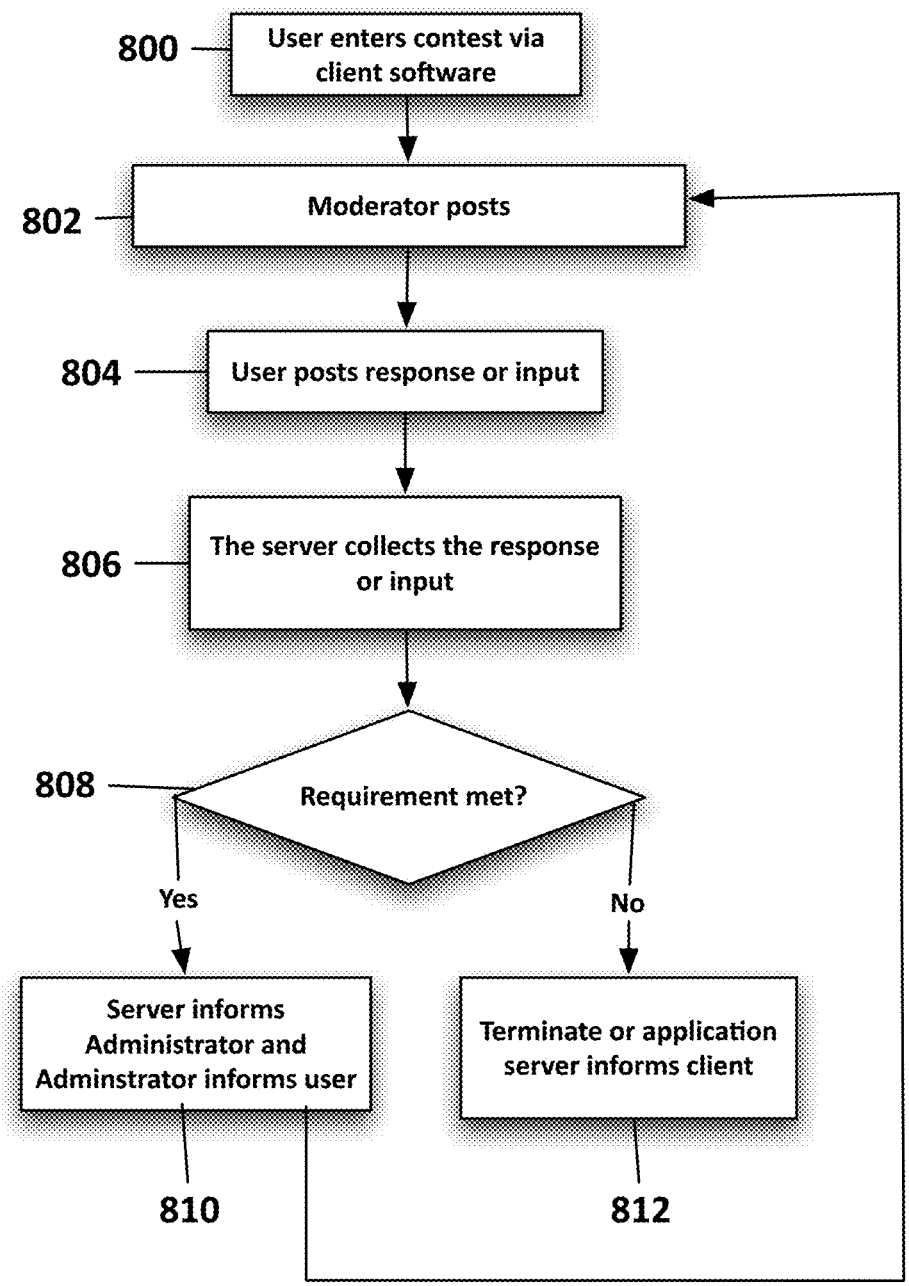
FIG. 8 shows a sample embodiment of the flow of a typical moderated post, user response, a comparison of the user response to the predetermined criteria to determine if there is a match, and the handling of the result of that comparison.

FIG. 8 shows a sample embodiment of the flow of a typical moderated post, user response, a comparison of the user response to the predetermined criteria to determine if there is a match, and the handling of the result of that comparison. In step 800 the user enters the contest, step 802 the moderator enters a moderated post. Step 804 shows the user response. Step 806 shows the application server collecting that user response from the communication platform(s) for which a particular contest is set up. Step 808 shows the application server comparing the user response to the predetermined criteria. If the criteria is met, step 810 shows that the application server informs the administrator that the criteria has been met and in one or more embodiments, the administrator causes that application server to inform the client software that the criteria and user response match. In alternate embodiments the administrator causes the application server to directly inform the user that the criteria match. In alternate embodiments the administrator directly informs the user that the criteria and response match. Step 812 shows that the application server terminates the action or informs the client software that the criteria and response do not match. Steps 302 through 312 are repeated until all contest criteria are met for every challenge.

Figure 9:
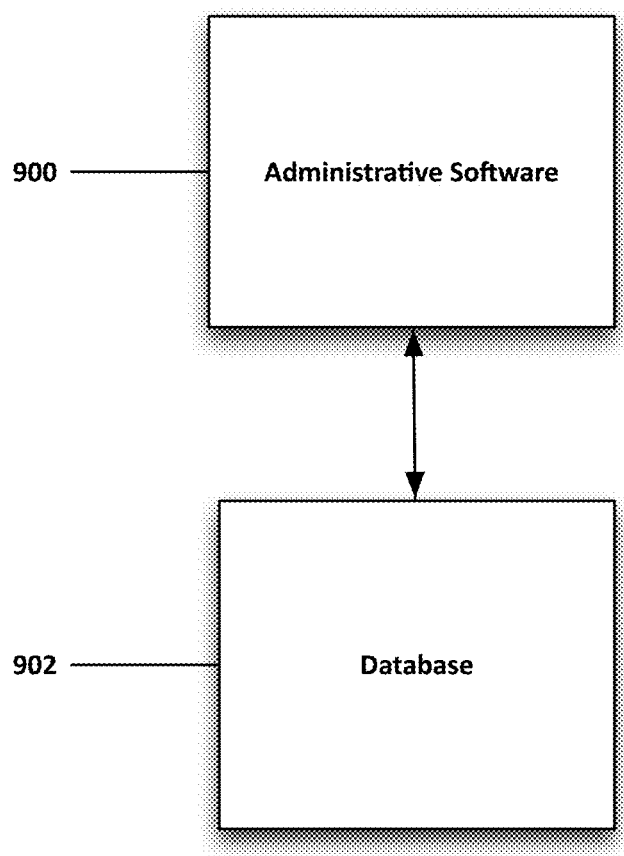
FIG. 9 shows the connection of the administrative software and the database.

FIG. 9 shows the connection of the administrative software and the database. Step 900 shows the administrative software, which resides on the application server. It is the software used to create contests, administer contests, accept users, administer users, track and collect user responses and compare against predetermined criteria, inform the administrator of and users that have successfully match their user responses to the predetermined criteria. Step 902 shows the database, which stores all of the collected data from each contest. In one or more embodiments, the administrative software and the database can reside on the same application server. In alternate embodiments the administrative software and the database can reside on different servers, an application server and a database server. In one or more embodiments the administrative software handles all of the tasks listed above and transfers all game, user and other data in a database. In any embodiment, application and database servers can reside on physical servers, virtual servers, or cloud based servers based on the specific needs of the system's needs.

FIG. 10 shows an example embodiment of a list of contest entrants (users). This figure shows a single embodiment of the administrative software for illustrative purpose. This embodiment shows Twitter as the communication platform used. Step 1000 shows a field for internally generated numerical identifier. This identifier is unique to each user. Step 1002 shows a field for the logged twitter identification number unique to each Twitter user. Step 1004 shows a field for the logged Twitter username unique to each Twitter user. Step 1006 shows a field for logging actual name of each user. Step 1008 shows a field for an email for each user. Step 1010 shows a field for the status of each user. In this embodiment the status can show active, inactive and blocked. Step 1012, in this embodiment, shows a field for a menu pull down that deletes users, blocks users, and moves to the user detail page.

Figure 11:
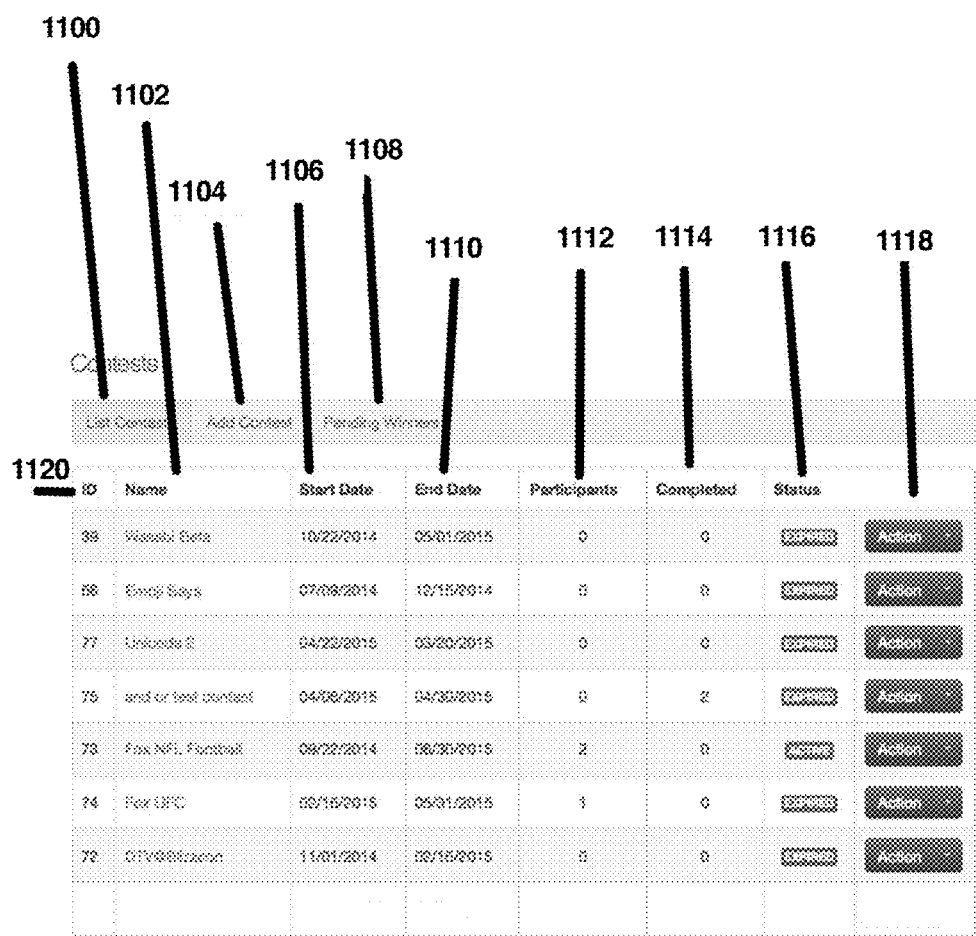
FIG. 11 shows an example embodiment of a list of contests.

FIG. 11 shows an example embodiment of a list of contests. This figure shows a single embodiment of the administrative software for illustrative purpose. This embodiment shows Twitter as the communication platform used. Step 1100 is a button that shows the contest list. Step 1104 brings up a blank contest detail page for creating a new contest. Step 1108 brings up a list of pending winners for contests. Step 1120 shows a field for internally generated numerical identifier. This identifier is unique to each contest. Step 1102 shows a field for displaying each contest name. Step 1106 shows a field for displaying the start date for each contest. Step 1110 shows a field for displaying the end date for each contest. Step 1112 shows a field for displaying the number of users participating in each contest. Step 1114 is a field for displaying the number of users participating in each contest that have completed all challenges for that contest. In this embodiment challenges are referred to as 'medals'. Step 1116 shows a field for displaying the status for each contest. In this embodiment statuses include, pending, active, inactive, and completed. Step 1118 shows a field for a menu pull down with several options including: resetting the contest to its initialized state, deleting the contest, and moving to the contest's viewing/editing page.

Figure 12:
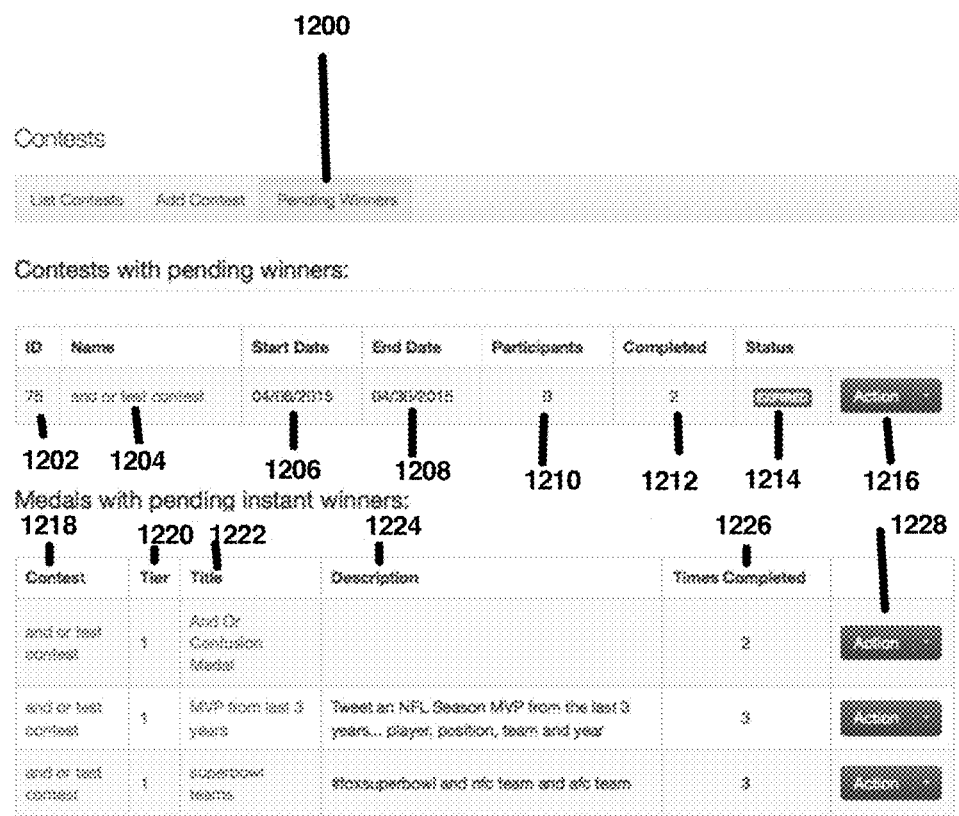
FIG. 12 shows an example embodiment of a list of pending winners for contests.

FIG. 12 shows an example embodiment of a list of pending winners for contests. This figure shows a single embodiment of the administrative software for illustrative purpose. This embodiment shows Twitter as the communication platform used. Step 1200 is a button that shows the pending winners list. Step 1202 shows a field for internally generated numerical identifier. This identifier is unique to each contest. Step 1204 shows a field for displaying contest names with pending winners. Step 1206 shows a field for displaying contest start dates. Step 1208 shows a field for displaying contest end dates. Step 1210 shows a field for displaying the number of users participating in the contest with a pending winner. Step 1212 shows a field for displaying the number of users that are participating in each contest that have completed all of the challenges for that contest.

In this embodiment challenges are referred to as medals. Step 1214 shows a field for displaying contest status. Step 1216 shows a field for a menu pull down with several options including: reset contest, delete contest, view/edit contest, view winners. Step 1218 shows a field for displaying the contest name for which there is a pending medal winner. Step 1220 shows a field for displaying the tier of the medal for which there is a pending winner. Step 1222 shows a field for displaying the title of the medal for which there is a pending winner. Step 1224 shows a field for displaying description for the medal for which there is a pending winner. Step 1226 shows a field for displaying the number of times a user who is participating in a contest has completed a medal with a pending winner. Step 1228 shows a field for a menu pull down with several options including: deleting medal, view/edit medal, and view winners for that medal.

Figure 13:
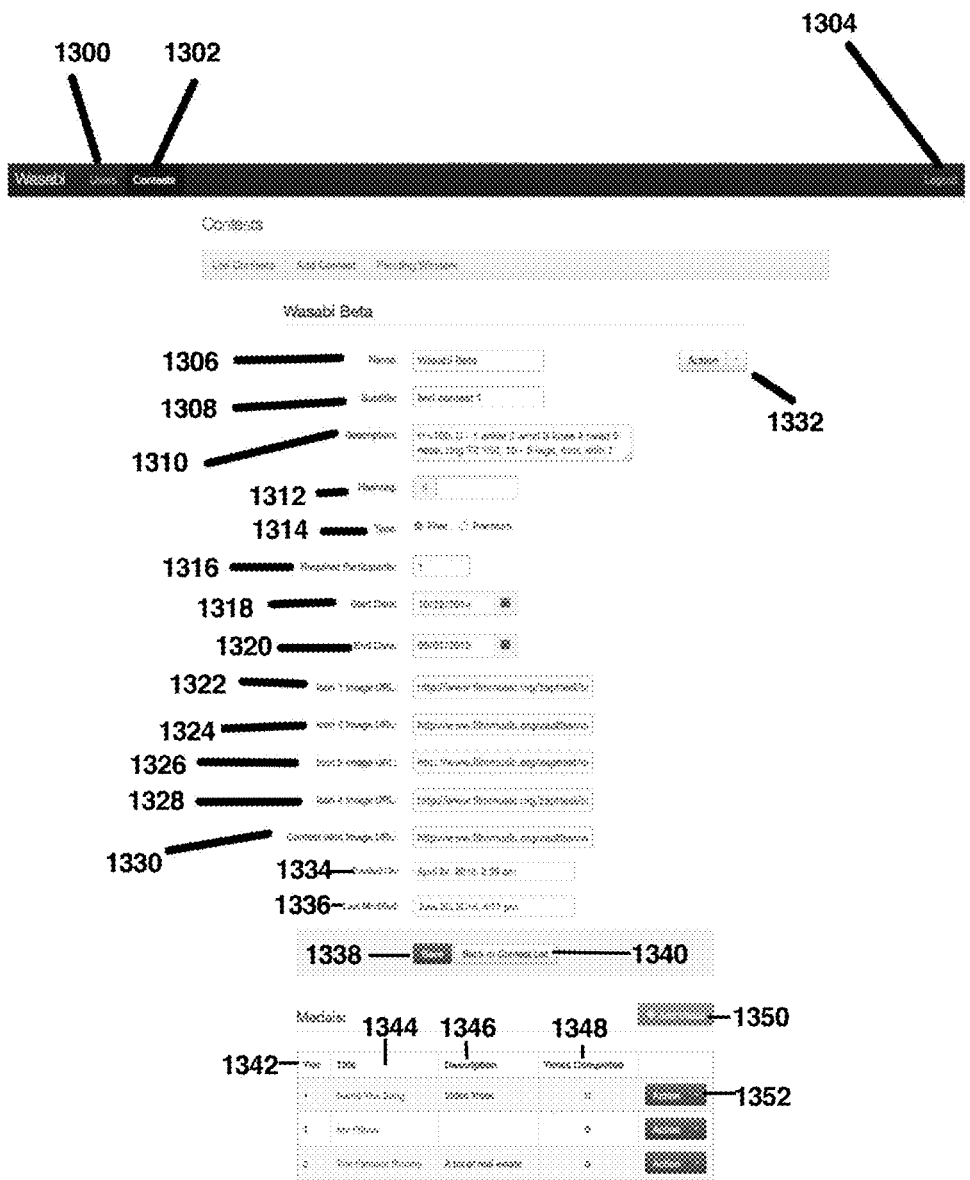
FIG. 13 shows an example embodiment of a contest setup page.

FIG. 13 shows an example embodiment of a contest setup page. This figure shows a single embodiment of the administrative software for illustrative purpose. This embodiment shows Twitter as the communication platform used. Step 1300 shows a button that navigates to the user list. Step 1302 shows a button that navigates to the contest list. Step 1304 shows a button for logging out of the administrative software. Step 1306 shows a field for entering the text for the name of the contest being edited. Step 1308 shows a field for entering the text for the subtitle of the contest being edited. Step 1310 shows a field for entering the text for the description of the contest being edited. Step 1312 shows a field for entering the text for the #hashtag filter used for the contest. Step 1314 shows a toggle for choosing whether the contest is free or has a fee for entry. Step 1316 shows a field for entering the minimum number of users required to participate in the contest before the contest becomes active. Step 1318 shows a field for entering the start date of the contest. Step 1320 shows a field for entering the end date of the contest. Step 1322 through 1328 show fields for entering URL addresses that in turn tell the client software where to find UI assets to display when needed. Step 1330 shows a field for entering a URL address that that in turn tells the client software where to find the grand prize information to display when needed. Step 1332 shows a field for a menu pull down with several options including delete and reset. Step 1334 shows an auto filled date created field. Step 1336 shows an auto filled modified date field. Step 1338 is a button for saving the edits to the page and Step 1340 is a button for returning to the contest list. Step 1342 shows a field for the listing of a medal's tier. Step 1344 is field for listing the titles of the contest's medals, which in this embodiment is a reference to challenges. Step 1346 shows a field for listing the medal descriptions. Step 1348 shows a field that displays the number of times a medal has been completed. Step 1350 shows a button that creates a new blank medal creation page. Step 1352 shows a field for a menu pull down with several options including delete medal and view/edit medal.

Figure 14:
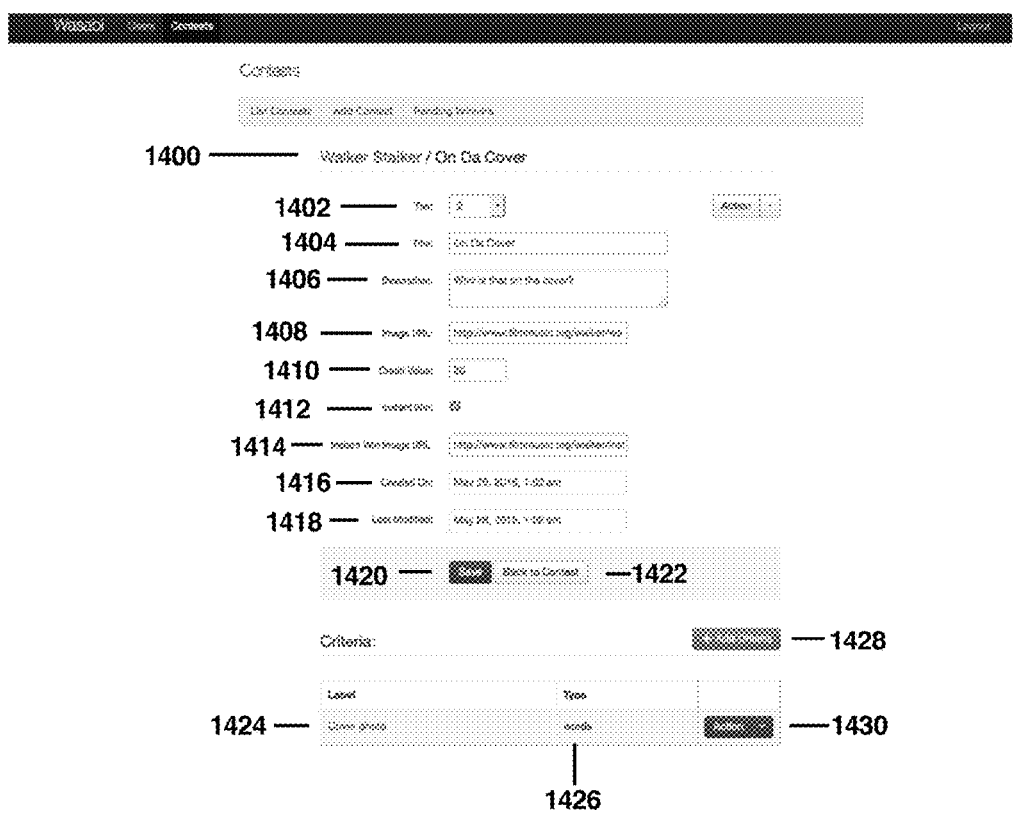
FIG. 14 shows an example embodiment of a challenge setup page.
Figure 15:
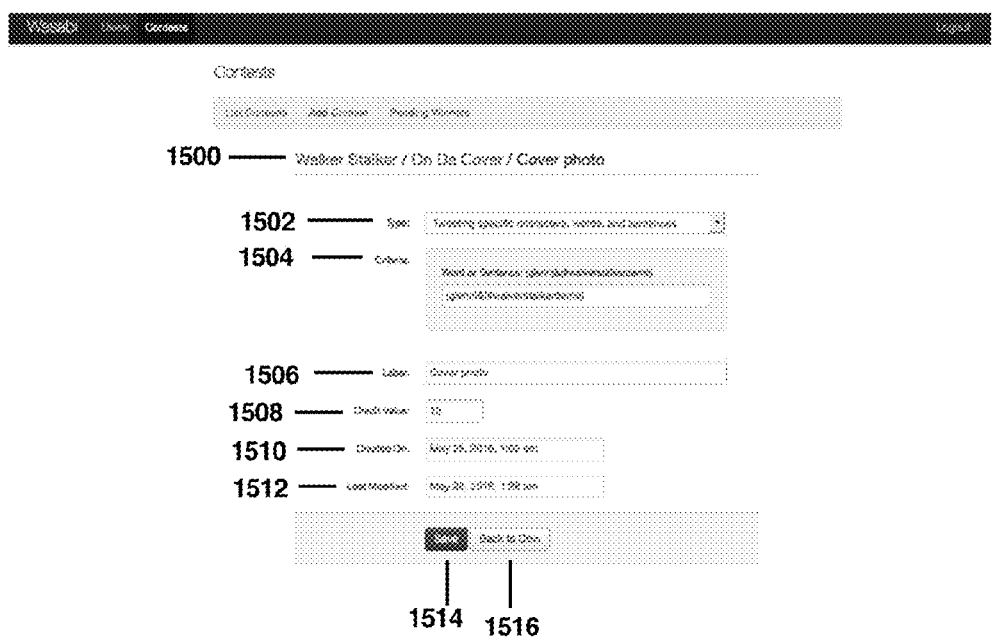
FIG. 15 shows an example embodiment of a predetermined criteria setup page.

FIG. 14 shows an example embodiment of a challenge setup page. In this embodiment challenges are referred to as medals. This figure shows a single embodiment of the administrative software for illustrative purpose. This embodiment shows Twitter as the communication platform used. Step 1400 shows the name of the contest followed by the name of the medal that is currently being edited. Step 1402 shows a field for a menu pull down with options for tier level. In one or more embodiments, tiers refer to the placement of the medal's (challenge's) visual representations in the client software, where tier 1 would be displayed in the $1^{st}$ row of displayed medal, tier 2 would be displayed on the $2^{nd}$ row of displayed medals, etc. In alternate embodiments the tiers can also refer to the perceived difficulty of the actions connected to each predetermined criteria for each medal. Tier 1 medals would have the least difficult actions to match user responses to a medal's predetermined criteria, Tier 2 medals would have more difficult actions to match user responses to a medals predetermined criteria, tier 3 even more difficult actions, etc. Step 1404 shows a field for entering the medal name of the medal currently being edited. Step 1406 shows a field for entering a description of the medal currently being edited. Step 1408 shows a field for entering a URL that will in turn tell the client software where to find the medal assets to display when needed. Step 1410 shows a field for entering credit value for the medal. In one or more embodiments credits are a point value assigned to a challenge. These point values can be used in a number of ways. In one or more embodiments points can be used as a virtual currency that can be used to purchase various items in the system. In alternate embodiments points could be used to monitor usage with the intent of rewarding users for activity in the system. Sometimes this is commonly referred to as a frequent user reward system. In alternate embodiments points can be used as a value that is used to rank users in relation to each other. Sometimes this is commonly referred to as a leader board. The preceding embodiments are only to illustrate some examples of point usage. Step 1412 shows a check box for enabling or disabling an instant win for the medal currently being edited. An instant win is a result of the matching of user responses to all of the predetermined criteria for a medal (challenge). In this embodiment the result is a reward of a physical prize to the user who was the first user to match their user responses to all of the predetermined criteria for a medal (challenge). Step 1414 shows a field for entering a URL that will in turn tell the client software where to find the instant prize (result) asset to display when needed. Step 1416 shows an auto filled date created field. Step 1418 shows an auto filled modified date field. Step 1420 shows a button for saving the edits to the page and Step 1422 shows a button for returning to the contest edit page. Step 1424 shows a field that displays each predetermined criteria for the medal currently being edited. Step 1426 shows a field that displays the type of action used for each predetermined criteria. In this embodiment actions are labeled as words, meaning specific text as individual words, phrases and other text groupings, actions, which can include (as a partial list) actions such as retweets, picture posting etc., and ??? (which makes the action unknown to the user). Step 1428 shows a button that creates a new blank predetermined criteria creation page. Step 1430 shows a field for a menu pull down with several options including delete medal and view/edit medal FIG. 15 shows an example embodiment of a predetermined criteria setup page. In this embodiment predetermined criteria is referred to as criteria. In this embodiment challenges are referred to as medals. This figure shows a single embodiment of the administrative software for illustrative purpose. This embodiment shows Twitter as the communication platform used. Step 1500 shows a field for displaying the contest name, the medal name that represents the medal that is currently being edited, and the criteria name that represents the criteria currently being edited. Step 1502 shows a field for a menu pull down with several options including: tweeting specific words, characters, and sentences, tweeting a definable number of times, tweeting a definable number of times in a definable period of time, retweeting a definable number of times in a definable period of time, retweeting a definable number of times in a definable period of time from a definable feed, tweeting a definable number mentions in a definable number of tweets in a definable period of time, tweeting a specific twitter handle in a definable number mentions in a definable number of tweets in a definable period of time, tweeting a definable number of hashtags in a definable number of tweets in a definable period of time, tweeting a definable specific hashtag in a definable number of tweets in a definable period of time, tweeting a definable number of pictures in a definable number of tweets in a definable period of time, tweeting a definable specific picture in a definable number of tweets in a definable period of time, tweeting a definable number of videos in a definable number of tweets in a definable period of time, tweeting a definable specific video in a definable number of tweets in a definable period of time, tweeting a definable number of links in a definable number of tweets in a definable period of time, tweeting a definable specific link in a definable number of tweets in a definable period of time, tweeting a definable specific link in a definable number of times in a definable number of tweets in a definable period of time, geotagging a definable number of times in a definable number of places over a definable period of time, geotagging definable specific place(s) a definable number of times over a definable period of time. These examples are for this embodiment only and are meant as an illustration of criteria actions. Alternate embodiments can have many other variations and are only limited by the actions available for any communication platform used for a contest. Step 1504 shows a field(s) for entering the specific predetermined criteria (criteria) for the selected action for the criteria currently being edited. Step 1506 shows a field for entering the name of the criteria currently being edited. Step 1508 shows a field for entering credit value for the criteria. In one or more embodiments credits are a point value assigned to a criteria. These point values can be used in a number of ways as previously listed. Step 1510 shows an auto filled date created field. Step 1512 shows an auto filled modified date field. Step 1514 shows a button for saving the edits to the page and Step 1516 shows a button for returning to the medal edit page. In alternate embodiments, predetermined can be timed. For example a predetermined criteria, once live, can have a time limit to allow a user response match that predetermined criteria before it expires or changes to another predetermined criteria.

Figure 16:
FIG. 16 shows an example embodiment of the client software initial screen before signing into the communication platform used in a particular contest.

FIG. 16 shows an example embodiment of the client software initial screen before signing into the communication platform used in a particular contest. This figure shows a single embodiment of the client software for illustrative purpose. This embodiment shows Twitter as the communication platform used. Step 1600 shows a button that initiates the API login screen for Twitter. Step 1602 shows a link to a user agreement and check box to agree or not with the system's user agreement. Step 1604 shows the filter(s) being used for the Twitter feed below it. Step 1608 shows an example of a moderated post and 1606 shows an example of a user response.

Figure 17:
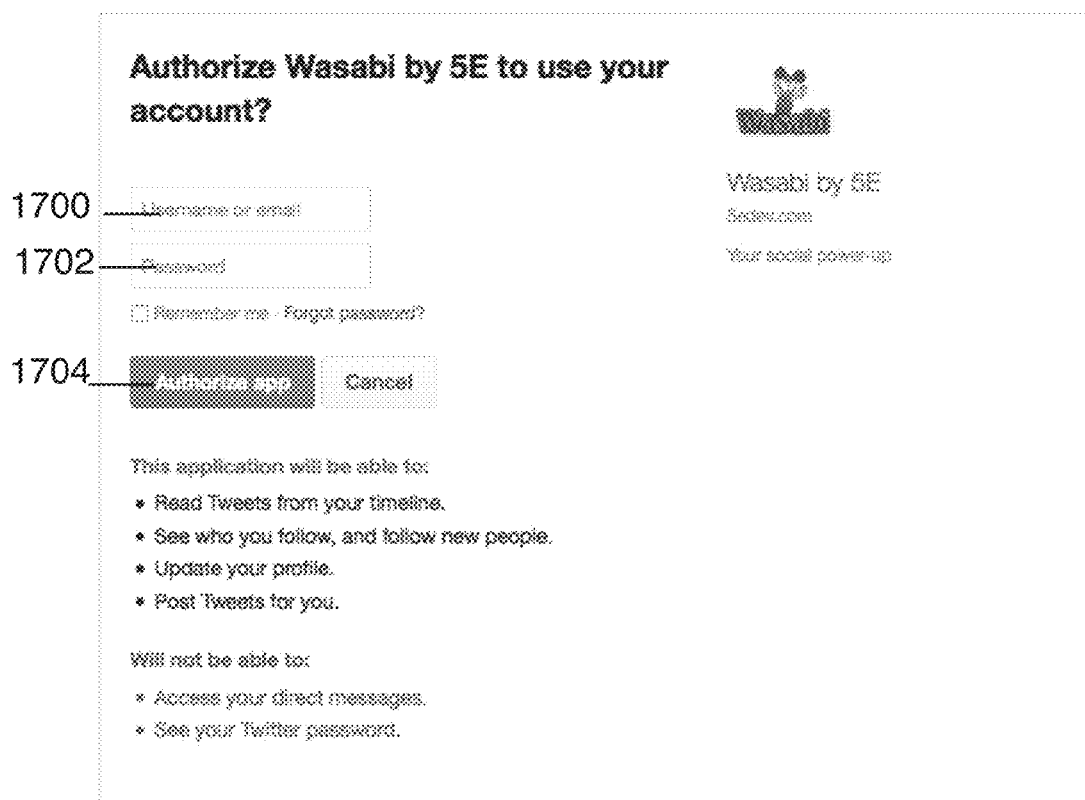
FIG. 17 shows an example embodiment of a Twitter login screen integrated into the client software.

FIG. 17 shows an example embodiment of a Twitter login screen integrated into the client software although this login screen could be for any communication platform associated with a contest. Step 1700 shows a field for entering a user's Twitter handle or email address associated with their Twitter account. Step 1702 shows a field for entering a user's Twitter password. Step 1704 shows a button that will contact Twitter, verify the entered credentials and authorize Twitter's use in the system.

Figure 18:
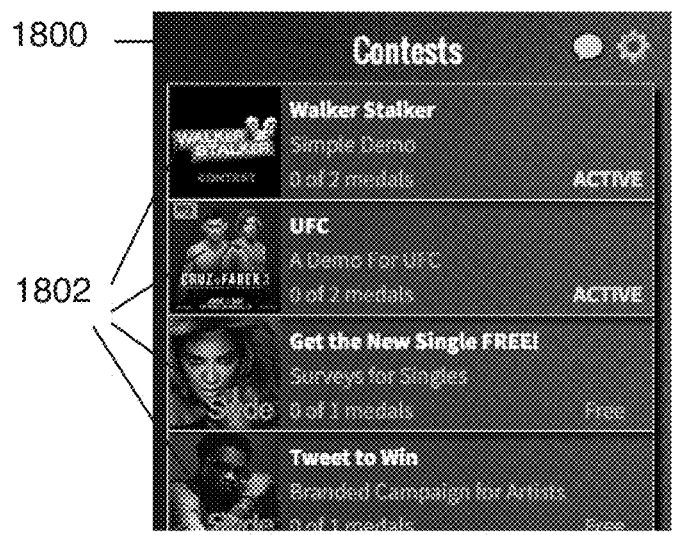
FIG. 18 shows an example embodiment of a contest list with multiple contests.

FIG. 18 shows an example embodiment of a contest list with multiple contests. Step 1800 shows the screen header. Step 1802 shows various depictions of available contests.

Figure 19:
FIG. 19 shows an example embodiment of a contest detail screen.

FIG. 19 shows an example embodiment of a contest detail screen. Step 1900 shows an illustration of the contest. In one or more embodiments, this visual asset's URL is sent from the administrative software to the client software. The client software then downloads it from the web server. Step 1902 shows a button for joining a contest. In this embodiment the join button registers the user into that particular contest. Step 1904 shows a button for leaving a contest. In this embodiment the leave button unregisters a user who was previously registered in a particular contest.

Figure 20:
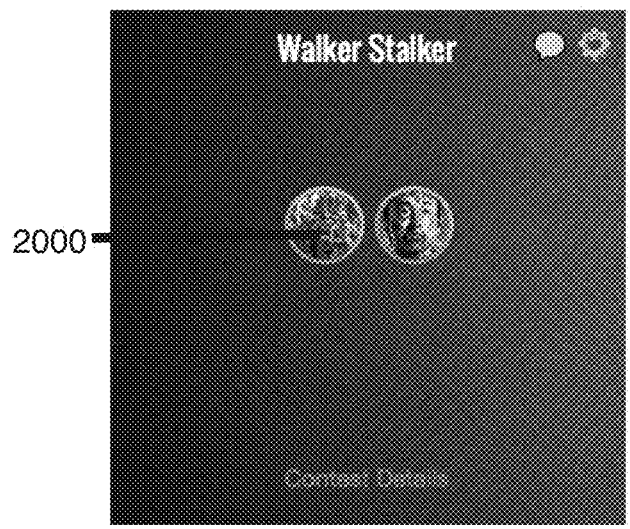
FIG. 20 shows an example embodiment of a visual depiction of 2 challenges on the medal overview screen.

FIG. 20 shows an example embodiment of a visual depiction of 2 challenges on the medal overview screen. Step 2000 shows graphic representations of 2 challenges. In this embodiment challenges are referred to as medals and on this medal overview screen there could possibly be up to 20 medals. The visual asset's URL is sent from the administrative software to the client software. The client software then downloads it from the web server.

FIG. 21 shows an example embodiment of medal close-up views. In this embodiment, challenges are referred to as medals. Step 2100 shows a visual depiction of a single medal. Step 2102 shows a label that outlines the type of action attributed to each predetermined criteria. The visual asset's URL is sent from the administrative software to the client software. The client software then downloads it from the web server.

Figure 22:
FIG. 22 shows an example embodiment of a medal win screen.

FIG. 22 shows an example embodiment of a medal win screen. In this embodiment, challenges are referred to as medals. Step 2200 shows a visual notification of a single medal won.

Figure 23:
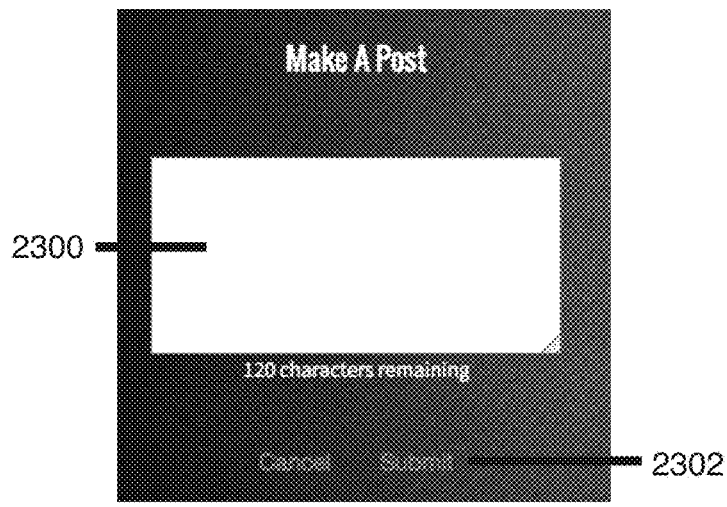
FIG. 23 shows an example embodiment of a communication platform's posting screen.

FIG. 23 shows an example embodiment of a communication platform's posting screen. Step 2300 shows an entry box for entering text and other information to be sent to Twitter. Step 2302 shows a button for submitting that text and other information. Step 2304 shows a tweet after it was sent to Twitter, and posted on Twitter. In this embodiment, the contest's filter is automatically submitted to Twitter when the text and other information is submitted.

Figure 24:
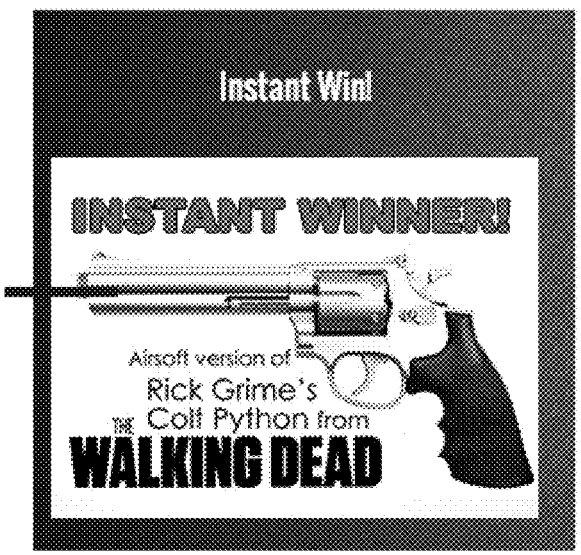
FIG. 24 shows an example embodiment of an instant win screen.

FIG. 24 shows an example embodiment of an instant win screen. In this embodiment, challenges are referred to as medals. Step 2400 shows a result of a user's responses matching all the predetermined criteria for a medal (challenge). In this embodiment, the result is an instant prize. In this embodiment step 2402 shows a post from the application server affirming that the user matched their responses to the predetermined criteria for a particular medal.

Figure 25:
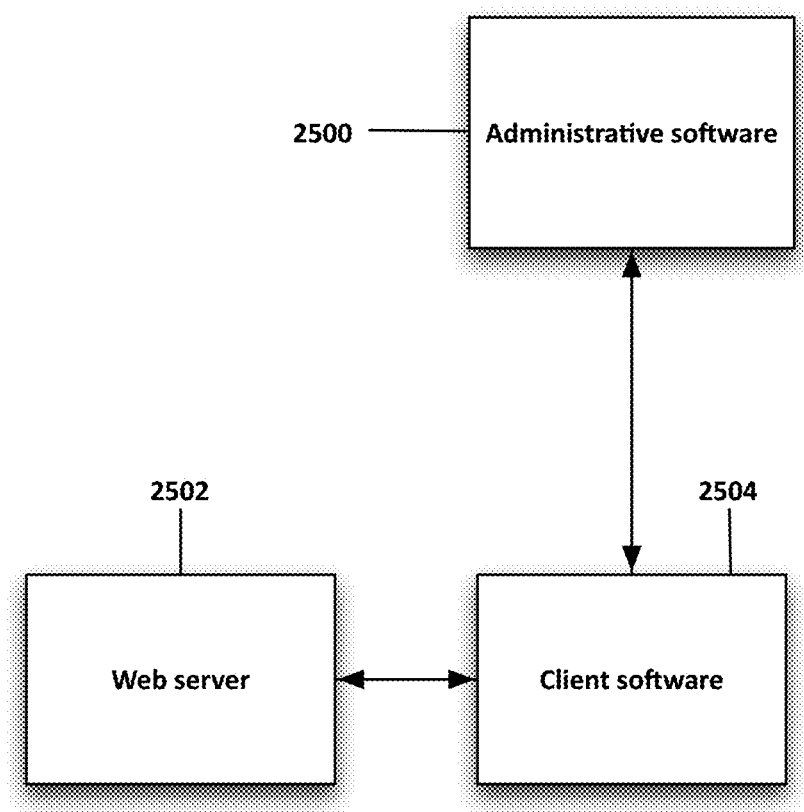
FIG. 25 shows the relationship between hardware systems for the games visual and audio assets.

FIG. 25 shows the relationship between hardware systems for the games visual and audio assets. Step 2500 shows the administrative software, which is contained in the application server. In one or more embodiments, URL addresses for each visual or aural asset displayed in the client software (step 2504) are entered into various fields contained in the contest and client setup portions of the administrative software. These URLs point to a web server (step 2502) In alternate embodiments some or all of the visual or aural assets may be contained in the client software (step 2504). Step 2502 refers to a web server, which can be for example a dedicated server, a cloud server, a virtual server. It can be any server solution that can be accessed on the Internet. The web server contains the visual and aural assets for each contest. Each asset on the web server has a URL address on it using any appropriate protocols, for example http or ftp. Step 2404, in one or more embodiments, shows the client software receiving the URL information for each visual and aural asset from the administrative software (step 2500). The client software downloads or displays the assets by querying the webserver (step 2502) for each URL address.

Figure 26:
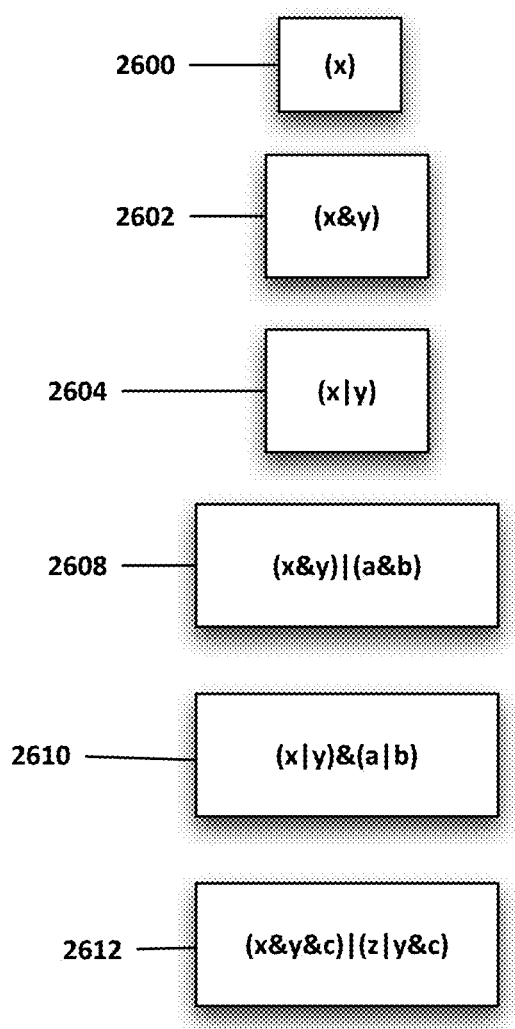
FIG. 26 shows example of the logic for one or more embodiments of the predetermined criteria.

FIG. 26 shows example of the logic for one or more embodiments of the predetermined criteria. These steps are to show various examples for understanding into the logic by which a multitude of different variations can be created. Step 2600 shows a simple single answer predetermined criteria. The parentheses designate a grouping and in other embodiments can be any other kind of designator for grouping. The letters designate an action that can be assigned to predetermined criteria. (For example a word, a phrase, a geolocation, or a picture.) Step 2600 would be a single answer to correctly match the predetermined criteria. For example, if x='orange' for a specific predetermined criteria then the user response that would match that predetermined criteria would be 'orange'. Step 2602 shows a parenthetical grouping. Contained in that grouping are x&y, where '&' is an operator with the meaning 'and'. 'x' designates an action that can be assigned to a predetermined criteria and 'y' designates a separate action that can be assigned to a predetermined criteria. The operator requires that both actions be completed in a single user response to correctly match the predetermined criteria. In one or more embodiments the action for x and the action for y can be the same type of action. For example, if x=lemon and y=cat, the user response would need to contain both the words, lemon and cat for it to correctly match the predetermined criteria. In alternate embodiments, the action for x and the action for y can be different types of actions. For example, if x=lemon and y=geolocating the user's current location. The user response would need to contain both the word, lemon and a geolocation post of the current position on earth of the user for it to correctly match the predetermined criteria. (The ability to use the same or different actions in a grouping or between groupings as described in the above embodiment and alternate embodiment is valid for any part of the FIG. 26 logic including any formula not included in the examples). Step 2604 shows a parenthetical grouping that contains 'x|y'. '|' is an operator with the meaning 'or', 'x' designates an action that can be assigned to a predetermined criteria, and 'y' designates a separate action that can be assigned to a predetermined criteria. The operator requires that either of the actions be completed in a single user. If x=lemon and y=cat the user response would need to contain at least the word 'lemon' or the word cat for it to correctly match the predetermined criteria. Step 2608 shows several parenthetical groupings in a single predetermined criteria where each parenthetical grouping represent one or more actions that are independent of other parenthetical groupings. In this example x=orange, y=apple, a=dog, b=cat. The $1^{st}$ parenthetical grouping contains the actions, orange and apple. The $2^{nd}$ parenthetical grouping contains the actions, dog and cat. Between the 2 parenthetical groupings is the operator '|'. In this example, the user response would need to contain 'orange' and 'apple' or 'dog' and 'cat' for it to match the predetermined criteria. Step 2610 shows several parenthetical groupings in a single predetermined criteria where each parenthetical grouping represent one or more actions that are independent of other parenthetical groupings. In this example x=orange, y=apple, a=dog, b=cat. The $1^{st}$ parenthetical grouping contains the actions, orange or apple. The $2^{nd}$ parenthetical grouping contains the actions, dog or cat. Between the 2 parenthetical groupings is the operator '&'. In this example, the user response would need to contain 'orange' or 'apple' and 'dog' or 'cat' for it to match the predetermined criteria. For clarity these are among the words contained in the user response that would match the predetermined criteria: Orange dog, apple dog, orange cat, and apple cat. Step 2610 shows several parenthetical groupings in a single predetermined criteria where each parenthetical grouping represent one or more actions that are independent of other parenthetical groupings. In this example x=orange, y=apple, a=dog, b=cat. The $1^{st}$ parenthetical grouping contains the actions, orange or apple. The $2^{nd}$ parenthetical grouping contains the actions, dog or cat. Between the 2 parenthetical groupings is the operator '&'. In this example, the user response would need to contain 'orange' or 'apple' and 'dog' or 'cat' for it to match the predetermined criteria. For clarity these are among the words contained in the user response that would match the predetermined criteria: Orange dog, apple dog, orange cat, and apple cat. Step 2612 shows several parenthetical groupings in a single predetermined criteria where each parenthetical grouping represent one or more actions that are independent of other parenthetical groupings. This example contains more complex groupings. In this example x=orange, y=apple, z=lemon, c=#example (a communication platform filter.) The $1^{st}$ parenthetical grouping contains the actions, 'orange' and 'apple and #example'. The $2^{nd}$ parenthetical grouping contains the actions, 'lemon or cat and #example'. Between the 2 parenthetical groupings is the operator '1'. In this example, the user response would need to contain 'orange' and 'apple' and '#example' or 'lemon' or 'apple' and '#example' for it to match the predetermined criteria. For clarity these are among the words contained in the user response that would match the predetermined criteria: Orange apple #example, or lemon #example or apple #example. These parenthetical grouping are not limited in number nor are the actions or operators. For all of the above examples, words can be replaced with any action supported by the communication platform used for each specific contest.

Figure 27:
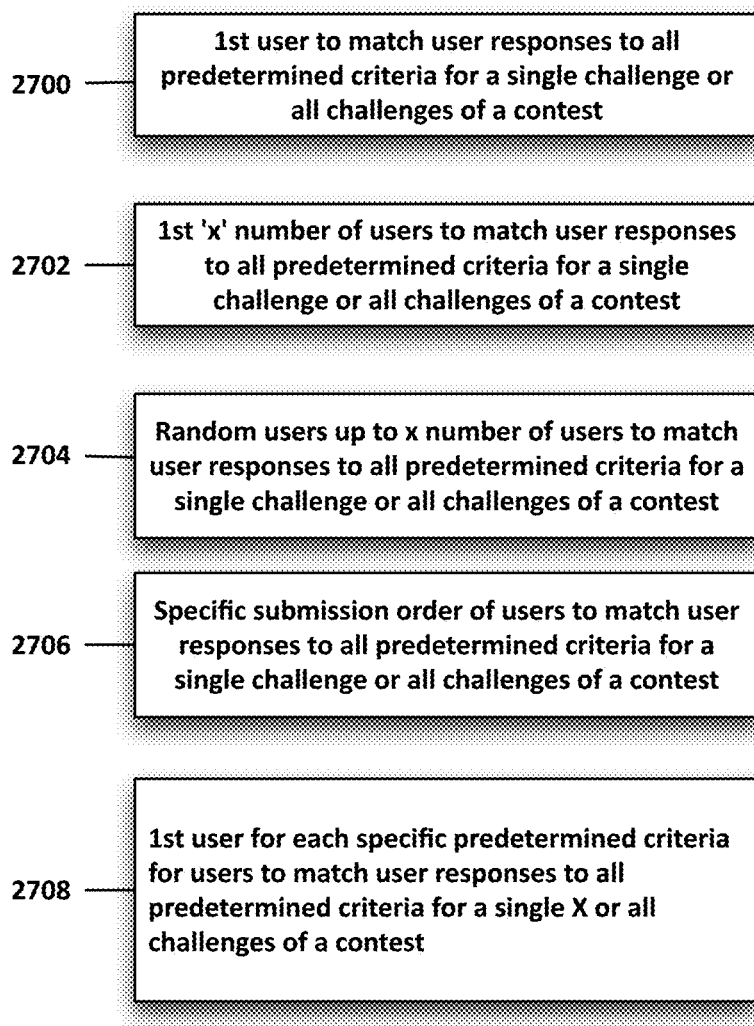
FIG. 27 shows example embodiments of the mechanisms in which rewards are awarded for user response that match the predetermined criteria.

FIG. 27 shows example embodiments of the mechanisms in which rewards are awarded for user response that match the predetermined criteria. These are examples and other variations are possible in various embodiments. In one or more embodiments Step 2700 shows a mechanism where the $1^{st}$ user to match their user responses to all of the predetermined criteria for a challenge is awarded with the specific reward(s) allocated to that challenge. In alternate embodiments the $1^{st}$ user that matches their user responses to all of the predetermined criteria for a challenge is awarded with the specific reward(s) allocated to that challenge, the subsequent users to match their user, up to a definable number from 1 to infinity are awarded different reward(s) (herein called a consolation reward). In one or more embodiments step 2702 shows a mechanism where the $1^{st}$ 'x' number of user (where x is a variable from 1 to infinity) to match their user to all predetermined criteria for a single challenge are awarded with the specific reward(s) allocated to that challenge. In alternate embodiments, the $1^{st}$ 'x' number of users to match their user to all of the predetermined criteria for a challenge are awarded with the specific reward(s) allocated to that challenge, the subsequent users to match their user to all predetermined criteria for a single challenge up to a definable number from 1 to infinity are awarded a consolation reward. In one or more embodiments step 2704 shows a mechanism where random users up to x number of users to match user to all predetermined criteria for a single challenge is awarded with the specific reward(s) allocated to that challenge. In alternate embodiments random users up to x number of users to match user to all predetermined criteria for a single challenge is awarded with the specific reward(s), the other users to match their user to all predetermined criteria for a single challenge up to a definable number from 1 to infinity are awarded a consolation reward. In one or more embodiments step 2706 shows a mechanism where a specific submission order of users to match user to all predetermined criteria for a single challenge (for example the $3^{rd}$, $7^{th}$ $12^{th}$ and $15^{th}$ match) is awarded with the specific reward(s) allocated to that challenge. In alternate embodiments, specific submission order of users to match user responses to all predetermined criteria for a single challenge is awarded with the specific reward(s) allocated to that challenge, the other users to match their user posts to all predetermined criteria for a single challenge up to a definable number from 1 to infinity are awarded a consolation reward. In 2708, one set of criteria in a challenge has more than one possible possibility for a match. Each of those possibilities can only be matched once by a user response. The subsequent user responses that use that possibility will not match. In alternate embodiments the administrator can set a variable for the number of user posts that can match with a possibility. In alternate embodiments, a non-match to a possibility will result in a result from the application server that the user had the right criteria, but it was a possibility that was no longer valid due to a previous user post match to that possibility. In one or more embodiments if x=0, 0=infinite. In alternate embodiments all of these examples can be applied when a user's responses are matched to all predetermined criteria of all challenges in a contest. In one or more embodiments we could call that type of reward a "grand prize" in alternate embodiments that type of reward can be named by other designations.

Figure 28:
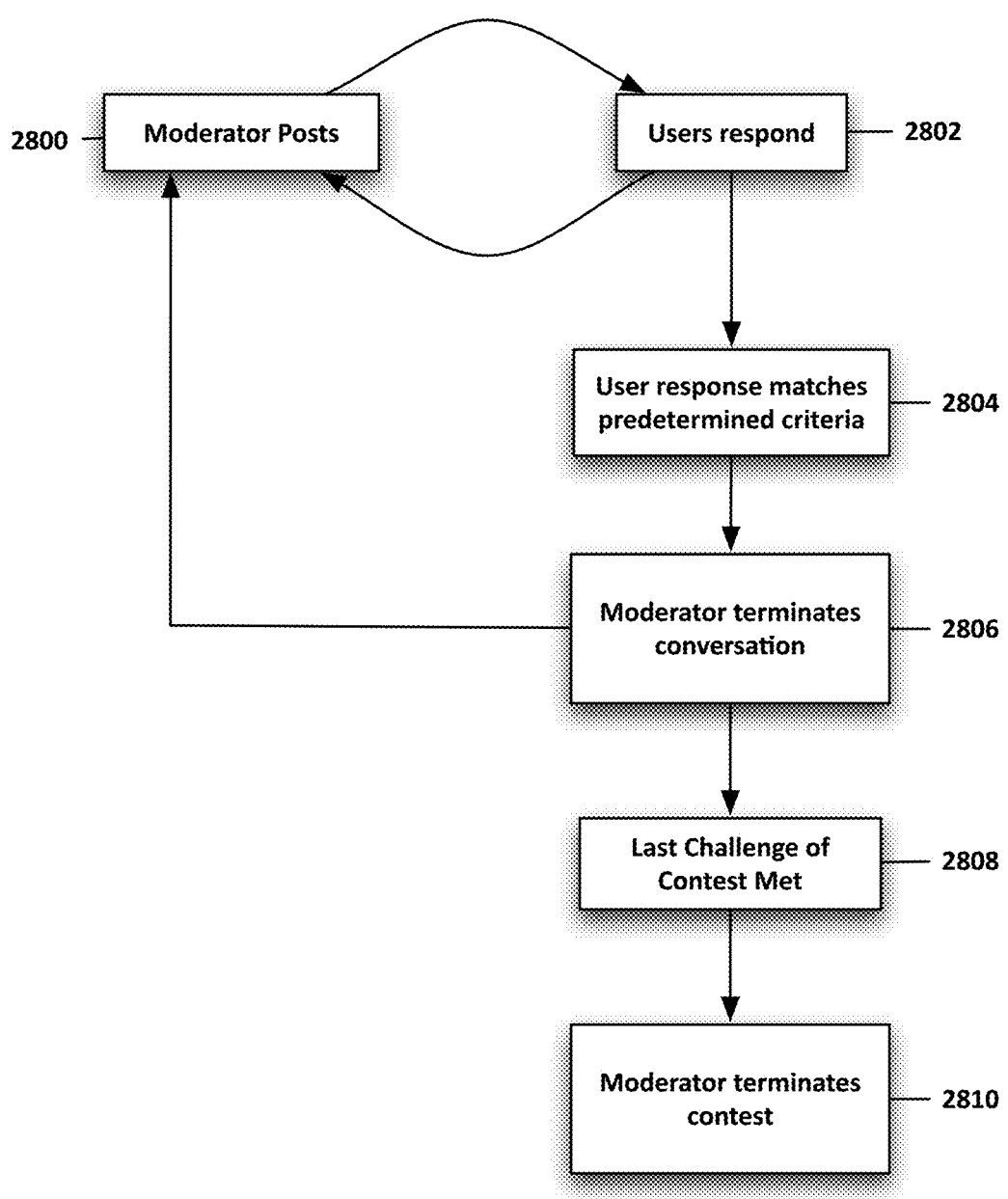
FIG. 28 shows how the moderator of a contest interacts with the user.

FIG. 28 shows how the moderator of a contest interacts with the user. Step 2800 shows a moderator posting. Step 2802 shows the users responding. This cycle repeats or loops with variations of sometimes allowing for more than one moderator posting before subsequent user responses and sometimes allowing for more than one user response before subsequent moderator postings. This back and forth between moderated posts and user responses is known as a conversation. The cycle is interrupted when step 2804, user response matches the predetermined criteria occurs. When this occurs, the moderator terminates that part of the conversation as illustrated in step 2806. As long as that user response match to the predetermined criteria did not complete the last challenge of the contest, a new conversation is initiated by the moderator as illustrated by the return to step 2800. If at step 2808 the moderator determines that the last challenge of the contest was completed by matching a user response to a predetermined criteria, the moderator terminates the contest in a moderated post as illustrated in step 2810 and the application server notifies the client software.

Figure 29:
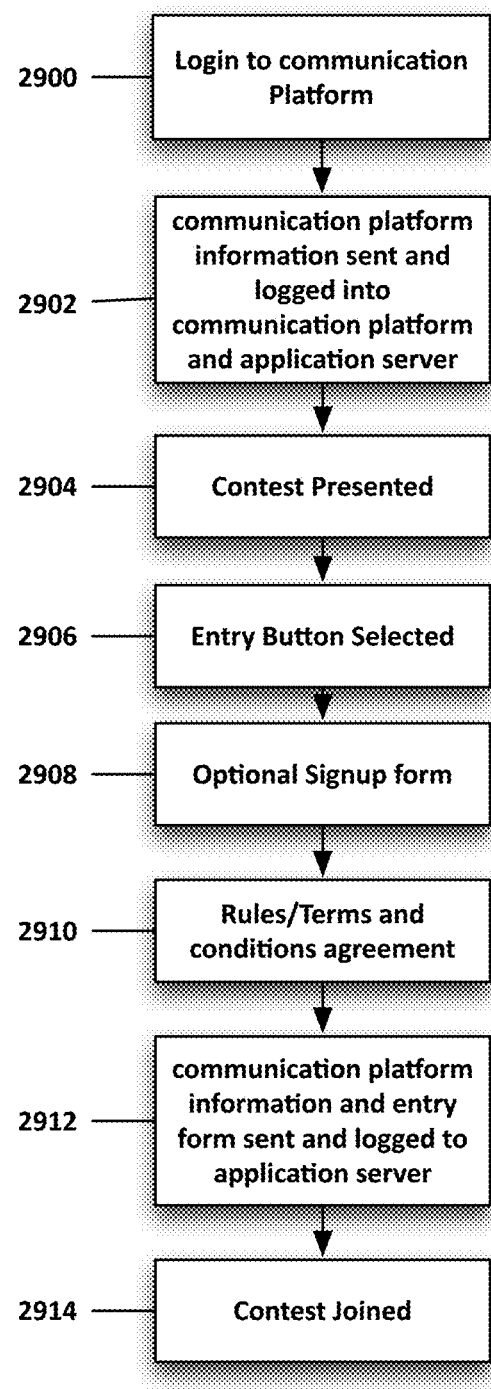
FIG. 29 shows an example embodiment of a platform and contest registration flow.

FIG. 29 shows an example embodiment of a platform and contest registration flow. Step 2900 shows a login to the communication system. In one or more embodiments, login to the communication platform would be achieved through a login API unique to that communication platform. In alternate embodiments that login to the communication platform would be achieved through a custom login system for that communication platform. In alternate embodiments the communication platform's user information could be sent and logged into the application server (step 2902). Step 2904 shows contest information for one or more contests. In one or more embodiments users would choose the contest they wish to join and as step 2906 shows, engage the entry button, link, or other mechanism for engagement. In alternate embodiments there might be a personal data form as a part of the contest entry process as shown in step 2908. In preferred embodiments there may be a rules and terms of service notice, step 2910 and any common mechanism for the user to acknowledge agreement of those rules and terms of service. Both step 2908, if present and step 2910 are sent and logged to the application server as shown in step 2912. Step 2914, upon logging successfully the user has joined the contest.

Figure 30:
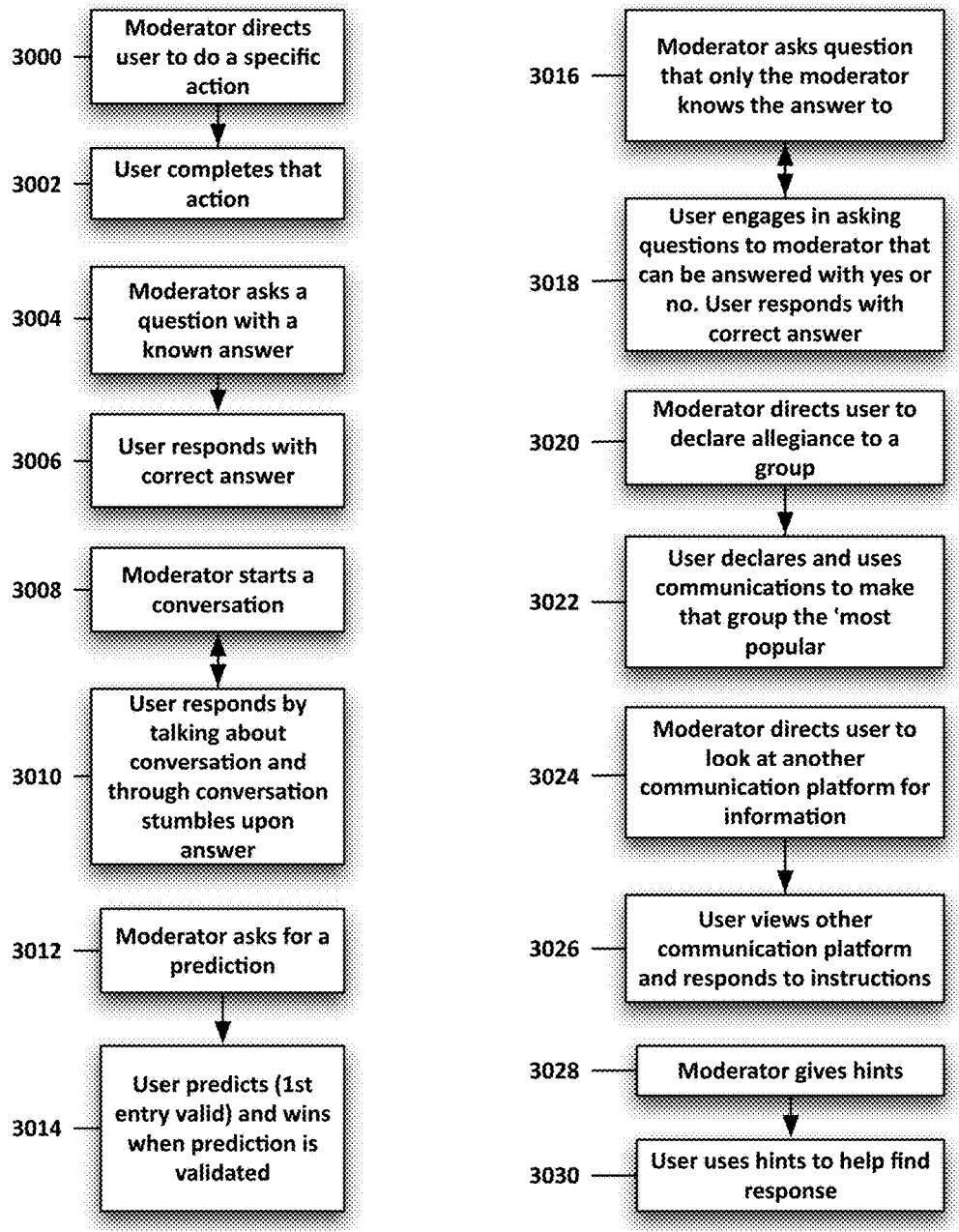
FIG. 30 shows, in one or more embodiments, various example types of challenges and responses.
Figure 31:
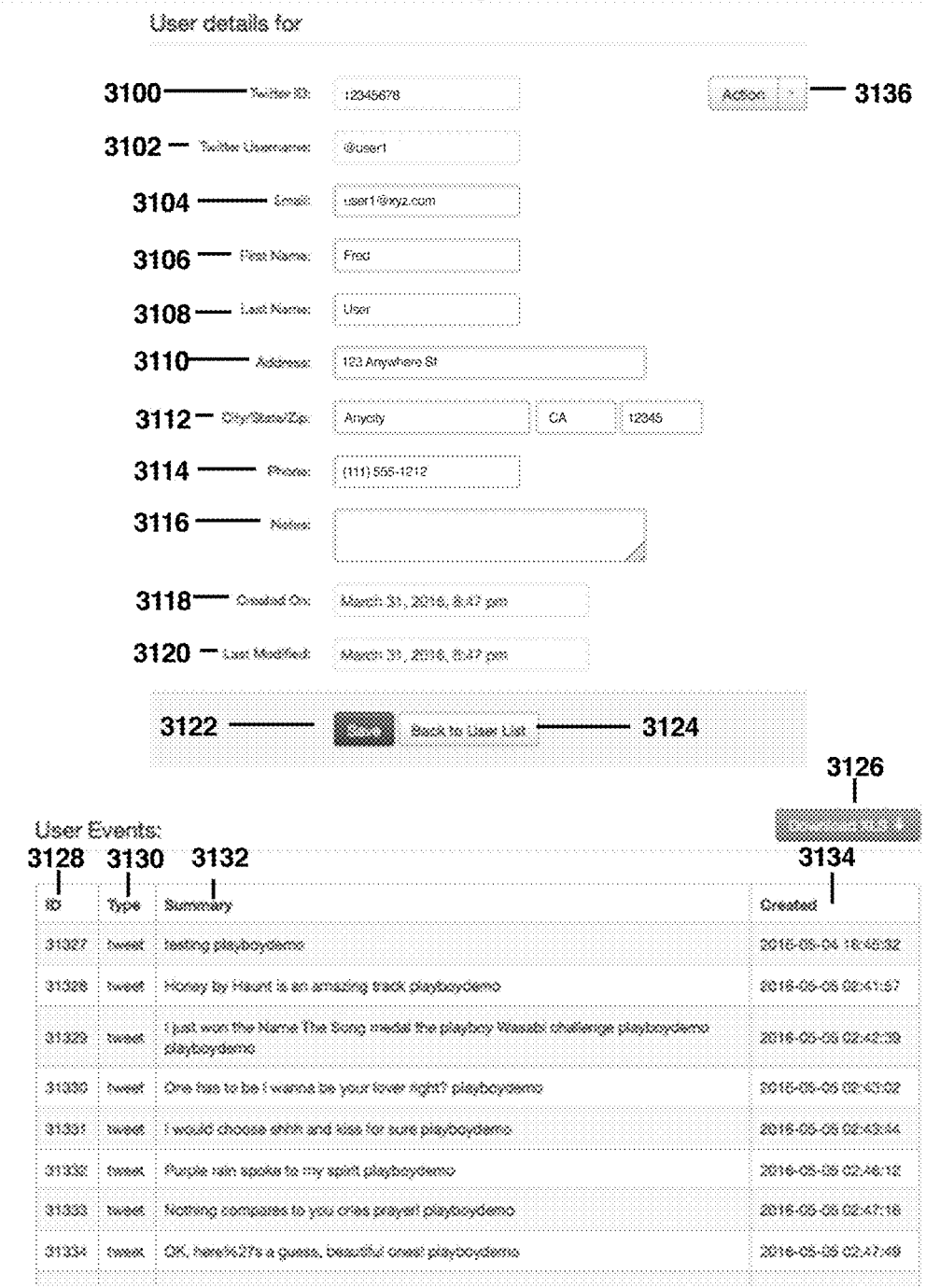
FIG. 31 shows an example embodiment of a user detail page.

FIG. 30 shows, in one or more embodiments, various example types of challenges and responses. These are illustrative only and have many variations FIG. 31 shows an example embodiment of a user detail page. This figure shows a single embodiment of the administrative software for illustrative purpose. This embodiment shows Twitter as the communication platform used and the following fields can be auto filled or they can be manually entered. Step 3100 shows a field that is used to enter the user's twitter ID. Step 3102 shows a field that is used for entering a user's Twitter handle. Step 3104 shows a field for entering a user's email address. Step 3106 shows a field for entering a user's first name. Step 3108 shows a field for entering a user's last name. Step 3110 shows a field for entering a user's street address. Step 3112 shows a field for entering a user's city, state, and zip code. Step 3114 shows a field for entering a user's phone number. Step 3116 shows a field for entering notes about a user, such a specific prize delivery requirements. Step 3118 shows an auto filled date created field. Step 3120 shows an auto filled modified date field. Step 3122 shows a button for saving the edits to the page and Step 1422 shows a button for returning to the user list page. Step 3126 shows a button for downloading a report of specific tweet traffic for the contest. In preferred embodiments, the types of reports available to download will vary greatly and the administrator will be able to customize those reports. Step 3128 shows a field for displaying an internally generated numerical identifier. This identifier is unique to each logged user response. Step 3130 shows a field for displaying the type of user response. In this embodiment it is a tweet. Step 3132 shows a field for displaying a summary of the user response. It can be text or a tweet action or both. Step 3134 shows a field for displaying a date and time stamp to each user response.

Figure 32:
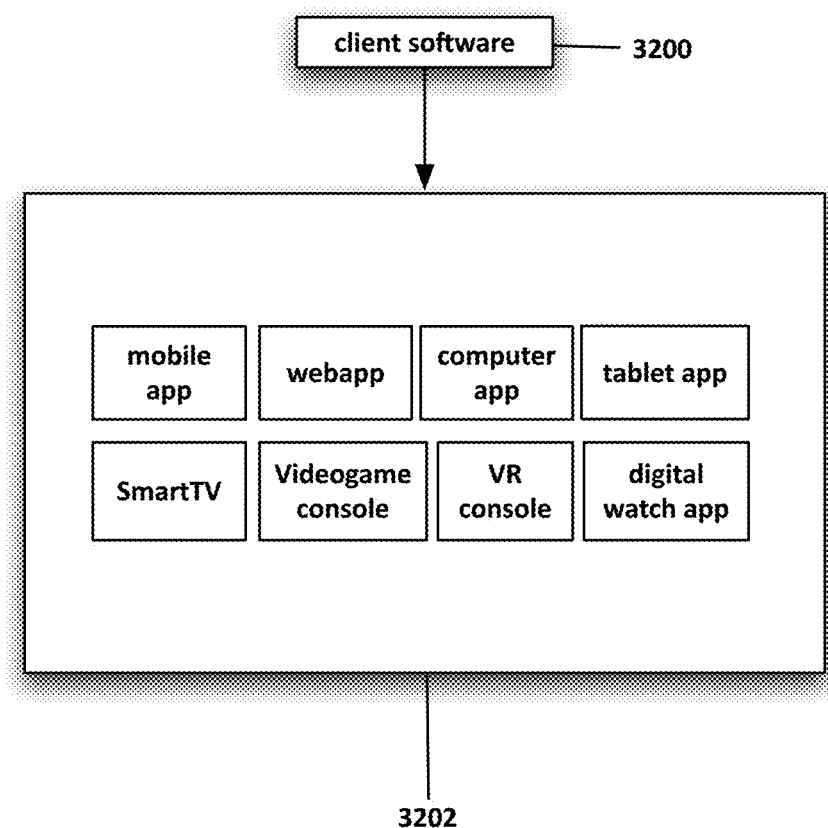
FIG. 32 shows examples of hardware platforms on which client software can reside.

FIG. 32 shows examples of hardware platforms on which client software can reside. The client software can reside on hardware platforms that connect to any internet or intranet, have an accessible SDK for developing the software for that platform, and be able to connect to a communication platform. Step 3200 shows the client software. Step 3202 shows some example hardware platforms for which to install the client software. These examples are examples that may meet the above-mentioned requirements: mobile apps, web apps, computer app, tablet app, SmartTV app, video game console, virtual reality (vr) console, digital watch app.

Figure 33:
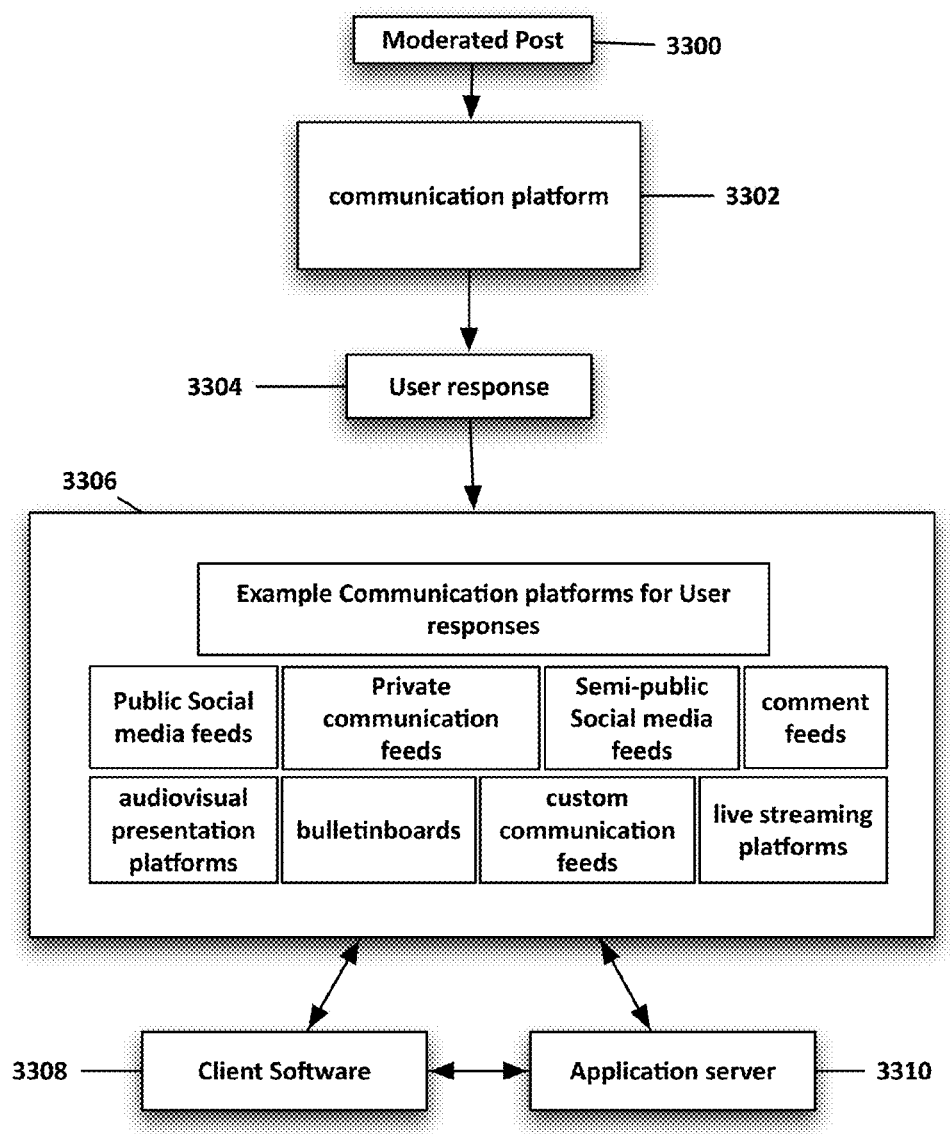
FIG. 33 shows examples of communication platforms used for user responses and logging by the client software and application server for matching those responses to predetermined criteria.

FIG. 33 shows examples of communication platforms used for user responses and logging by the client software and application server for matching those responses to predetermined criteria. Step 3300 shows a moderated post. It is displayed on one of various communication platforms (step 3302) as described in other figures. Step 3304 shows a user response. Step 3306 shows examples of the types of communication platforms that the system can use to track and log user responses. These examples represent a subset of communication platforms and are for illustrative purposes. Communication platforms that the system can use would allow for the posting of actions from the user and allow for the communication with other hardware and software components of the system through a public or private API or any other method of connecting to the platform. Examples of each platform type are as follows: Public social feeds like YouTube, private communication feeds like an internal company communication system, semi public social media feeds like Facebook or Instagram, comment feeds like on a news site or blog, audiovisual presentation platforms like Vimeo or Soundcloud, bulletinboards like forums, custom communication feeds like a custom feed made specifically for the game, and live streaming platforms like Twitch. Step 3308 shows the client software communicating with communication platform and with step 3310, the application server.

Figure 34:
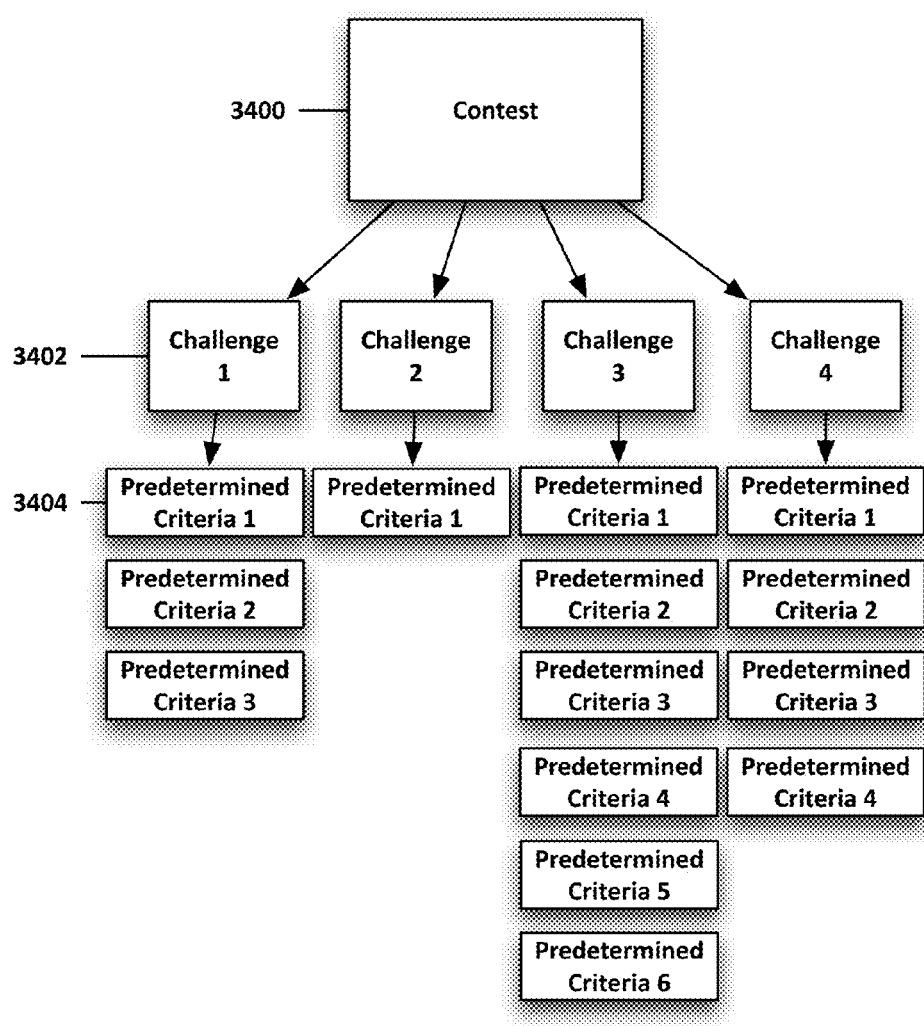
FIG. 34 shows the hierarchy of an example embodiment of a contest.

FIG. 34 shows the hierarchy of an example embodiment of a contest. Step 3400 shows a sample contest. Step 3402 shows several challenges. 1 or more challenges make up a contest. Step 3404 shows several predetermined criteria. 1 or more predetermined criteria make up each challenge.

In general, embodiments of the present invention provide a system and method for a moderated action/reaction based game centered around a 'conversation' between a moderator(s) and users (FIG. 28 steps 2800 and 2802) where moderated posts (step 600) are presented through any number of electronic and analog communication platforms (step 602), and the reactions are entered into various communication platforms (step 3306). Specifically, the present invention relates to a gaming/contest system that uses a number of various hardware and software components (FIGS. 6, 32, 33) to distribute various word, informational, and audiovisual inputs by human or automated computer program (a moderator) (Steps 202, 302, 400, 600, 702, 802, 2800, 3300, FIG. 30, example embodiment 1608) to create a viewable and/or hearable message over one or more various types of communication platforms (FIG. 6) with an intent to elicit user reactions (steps 204, 304, 404, 500, 604, 704, 804, 2802, 3304, FIG. 30, example embodiment 1606) to electronically collect and log the communications to a application server (steps 102, 208, 306, 508, 608, 708, 806, 3310), compare those reactions to a set of predetermined criteria to distinguish whether the reactions match one or more of the predetermined criteria, (Steps 210, 308, 710, 808, 2804, FIG. 4, 5, 27) and informs that user of the result of said comparison. (Steps 212, 214, 310, 312, 412, 418, 424, example embodiments, 2200, 2400) in an alternate embodiment administrator informs user of results (Steps 712, 714, 810, 812). These user reactions are displayed over various types of communication platforms. (step 3306) and the moderated posts can occur on the same, different, or a combination of the same and different communication platforms as the user posts (Step 602).

In one or more embodiments the result of matching user posts to all of the predetermined criteria for a single challenge (steps 414, 418, 3402) can be a prize, prize package, congratulations, points, virtual currency, coupons, entry into a sweepstakes or giveaway, or any other result that has real or perceived value. A result can be one or more of the possible results. In one or embodiments the result of matching user posts to all of the predetermined criteria for all of the challenges (step 420, 424, 3400) can be a prize, prize package, congratulations, points, virtual currency, coupons, entry into a sweepstakes or giveaway, or any other result that has real or perceived value. This embodiment is a completion of a contest and the result in some embodiments can be known as a grand prize.

In one or more embodiments, administrative software for the system is accessed on the application server (step 900, 2500, example embodiments FIG. 9, 10, 11, 12, 13, 14, 15, 31) where the administrator creates a contest (step 3400, example embodiments FIG. 11, 13,) they are saved (example embodiment step 1338) and stored in the database (step 900, 902) In alternative embodiments predetermined criteria are created and entered into the database in various way including direct input into the database. All items entered into the administrative software are sent to the database for storage when saved. In example embodiments the term 'contest' could be substituted by nomenclature that signifies or communicates for example, an event, game, or other unit of describing a series of distributed moderator posts and reactions that make up a whole unit.

In one or more embodiments the administrator then creates one or more challenges that make up a contest (step 3402, example embodiments steps 1342, 1344, 1346, 1348, 1350, 1352, FIG. 14). In example embodiments the term 'challenges' could be substituted by nomenclature that signifies or communicates for example, a medal, rune, trophy, badge or other unit of describing a subdivision of a contest. In alternate embodiments, challenges can be created and added to the contest after a contest has become active. In alternate embodiment, challenges can be enabled and disabled after a contest has become active. In alternate embodiments challenges can be timed. In one example the challenge can have a specific start time and end time before its predetermined criteria expire or reset. This in turn expires or resets the challenge. In another example, system can track average time to answer each challenge. A clock starts as a challenge goes live. When a user response matches all of the predetermined criteria for a challenge, the clock stops for that user for that challenge and the time is logged. When the next challenge goes live, a new clock commences its count. The cycle continues until all of the challenges in the contest are matched or completed. This allows for an average time to completing the contest is calculated grand prizewinners are decided based on that average time.

In one or more embodiments the administrator creates one or more predetermined criteria for each challenge. (Step 3404, example embodiments steps 1424, 1426, 1428, 1430, FIG. 15). Predetermined criteria are a set of actions that are to be matched by user responses to fulfill. Predetermined criteria are made up of a set of actions (example embodiments step 504). Actions are only limited by the actions available on chosen communication platform(s) for a contest. In alternate embodiments predetermined criteria can be timed. In one example the predetermined criteria can have a specific start time and end time before they expire or reset. In another example, the system can track average time to answer each predetermined criteria. A clock starts as a predetermined criteria goes live. When a user response matches that predetermined criteria, the clock stops for that user for that predetermined criteria. When the next predetermined criteria goes live, a new clock commences its count. The cycle continues until all of the predetermined criteria for a challenge are matched to the user responses. This allows for an average time to complete a challenge to be calculated and instant winners or consolation winners are decided based on that average time.

In one or more embodiments predetermined criteria are structured in groupings of any available actions (FIG. 26). There are number of mechanisms for determining which users are sent which results when their user responses match a predetermined criteria, when their user responses match all predetermined criteria for a challenge, and when their user responses match all predetermined criteria for all challenges, completing a contest. (FIG. 27)

In one or more embodiments, additional written, visual, and audio materials can be but are not required to be added to the database via administrative software to be used as descriptors, information, marketing material. (Example embodiments Steps 1308, 1310, 1322, 1324, 1326, 1328, 1330, 1406)

In one or more embodiments, the client software is a available as a mobile app. In alternate embodiments client software is available on other hardware platforms (example embodiment FIG. 32) Clients access or download the client software and follow a process of registration and logins to the various communication platforms. (steps 2900, 2902).

In the client software is a visual representation of the communication platform's feed. In the example embodiment (steps 1604, 1606, 1608), the feed is filtered to any number of contest related filters, for example hashtags and/or usernames. In the example embodiment it is through this feed that initial moderated posts are made. (Step 1608)

In one or more embodiments, the user chooses and enters an active or pending contest. (steps 1802, 1900, 1902, 2904, 2906, 2908, 2910, 2912, 2914)

An example embodiment, (FIG. 30) shows some typical moderator post types. Moderator posts can take place in the filtered communication platform feed or the moderator can instruct the user to view, listen, and/or read further moderator posts on a number of other communication platforms (step 602) for example in a sports broadcast or a specific commercial during the broadcast, on a web page, or in a digital video.

User responses are posted to the communication platform(s) associated with each contest. (Example embodiments steps 1604, 1606, 1608). In one or more embodiments, the responses are entered using an entry box within the client software (example embodiment step 2300, 2302) In alternative embodiments, the responses are entered using an entry box in the communication platform's own official software or $3^{rd}$ party software. For example, if the communication platform used by a contest is Facebook, users could use Facebook's app to enter responses. One could also use a $3^{rd}$ party company's Facebook app to enter their responses.

Users respond to moderator posts with actions that may or may not match the predetermined criteria for a challenge. (Example embodiments, FIG. 30.) Responses include actions that are supported by the communication platform used by a contest. (Example embodiments step 504). More than one type of action can be placed in a response. If a predetermined criteria required a hashtag and a word and a specific emoji then the response would also need to contain that specific hashtag, word, and emoji to create a match.

In one or more embodiments, each time a user response is posted to a communication platform the client software collects that response and sends it to the application server. (Steps 100, 102, 104, 204, 206 208, 506, 508, 510, 604, 606, 608, 610, 704, 706, 710, 3304, 3306, 3308, 3310) The application server then logs the response and checks for a match to the predetermined criteria for that contest. (steps 210, 408, 712, 714) If the user response matches a predetermined criteria the user is informed of the results. If the matched predetermined criteria fulfills a challenge or all of the challenges the user is informed of the results. If the user response does not match a predetermined criteria, the action is terminated although in alternate embodiments the user may be informed of the results. (Steps 212, 214, 410, 412, 414, 416, 418, 420, 422, 424, example embodiments steps 2200, 2400)

In alternate embodiments, each time a user response is posted to a communication platform, the application server then collects the response, logs the response, and checks for a match to the predetermined criteria for that contest. (Steps 308, 408, 810, 812). If the user response matches a predetermined criteria the user is informed of the results. If the matched predetermined criteria fulfills a challenge or all of the challenges the user is informed of the results. If the user response does not match a predetermined criteria, the action is terminated although in alternate embodiments the user may be informed of the results. (Steps 310, 312, 410, 412, 414, 416, 418, 420, 422, 424, example embodiments steps 2200, 2400)

In example embodiments the flow of moderated posts and user responses continue for a specific predetermined criteria until that predetermined criteria is met. (Steps 2800, 2802, 2804, and 2806). This back and forth between moderated posts and user response(s) is called a conversation.

A challenge is complete when a user's responses match all of the criteria for that challenge. (Steps 414, 416, 418, 3400, 3402)

A contest is complete when a user's responses math all of the criteria for all of the challenges for a contest. (Steps 420, 422, 424, 3402, 3404)

The various embodiments further can be implemented in a wide variety of operating environments, which in some cases can include one or more user computers, computing devices, or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols.

Various embodiments of the present disclosure utilize at least one network that would be familiar to those skilled in the art for supporting communications using any of a variety of commercially-available protocols. In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The environment can include a variety of data stores and other memory and storage media as discussed above. These can reside in a variety of locations, such as on a storage medium local to (and/or resident in) one or more of the computers or remote from any or all of the computers across the network.

Any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc. Such devices also can include a computer-readable storage media reader, a communications device (e.g., a modem, a network card (wireless or wired), an infrared communication device, etc.) and working memory as described above.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

What is claimed is:

1. A system for establishing a plurality of communication platforms, the system comprising:
a processor; and
an application server;
instantiates by the processor, a plurality of connections between the plurality of communication platforms wherein the processor:
tracks one or more moderated posts and one or more user responses;
tracks one or more results of the one or more user responses;
displays the one or more results of the one or more conversations;
instantiates one or more communication connections between one or more organizations and one or more moderators;
displays one or more graphical representations of one or more contest elements;
registers the one or more user information and sends the one or more user information to one or more application servers;
sends one or more user responses consist of actions that one or more communication platforms support and sent to one or more application servers; and
tracks one or more results from one or more contests from the one or more chosen communications platforms and the application servers,
wherein a plurality of predetermined criteria is created after a second communication platform is created, and the plurality of predetermined criteria is used to request and receive information from the plurality of communication platforms.

2. The system of claim 1, wherein the plurality of communication platforms further comprising one or more public feeds, one or more semi-public feeds, and one or more private feeds.

3. The system of claim 1, wherein the one or more moderated posts are conducted through the plurality of communication platforms in a first communication platform.

4. The system of claim 1, wherein the one or more moderated posts are conducted through the plurality of communication platforms in a second communication platform.

5. The system of claim 1, wherein the application server:
scans one or more user responses received through the plurality of communication platforms;
logs the one or more user responses;
matches the one or more user responses to one or more predetermined criteria; and
sends one or more match results to one or more application servers.

6. The system of claim 1, wherein the application server directly scans information to the plurality of communication platforms.

7. The system of claim 5, wherein the one or more match results are delivered to a user on the plurality of communication platforms by a plurality of sending communications.

* * * * *